(12) United States Patent  (10) Patent No.: US 8,063,317 B2
Bowman  (45) Date of Patent: Nov. 22, 2011

(54) RECESSED POKE-THROUGH FITTING

(75) Inventor: Timothy S. Bowman, Canton, CT (US)

(73) Assignee: Wiremold, Co., West Hartford, CT (US)

( * ) Notice: Subject to any disclaimer, the term of this patent is extended or adjusted under 35 U.S.C. 154(b) by 410 days.

(21) Appl. No.: 11/897,048

(22) Filed: Aug. 28, 2007

(65) Prior Publication Data
US 2008/0053697 A1  Mar. 6, 2008

Related U.S. Application Data

(60) Provisional application No. 60/840,911, filed on Aug. 29, 2006.

(51) Int. Cl.
H02G 3/08 (2006.01)

(52) U.S. Cl. ........ 174/483; 174/482; 174/486; 174/480; 220/3.2; 220/3.3; 52/220.8

(58) Field of Classification Search .......... 174/480–488, 174/490, 50, 53, 57, 58; 220/3.2–3.9, 4.02; 248/906; 439/535, 536, 135; 52/220.5, 220.8, 52/220.7
See application file for complete search history.

(56) References Cited

U.S. PATENT DOCUMENTS

| 1,717,836 A | 6/1929 | Conner |
| 3,646,244 A | 2/1972 | Cole |
| 4,059,321 A | 11/1977 | Rasmussen et al. |
| 4,091,231 A | 5/1978 | Sotolongo |
| 4,243,835 A | 1/1981 | Ehrenfels |
| 4,323,724 A | 4/1982 | Shine |
| 4,336,416 A | 6/1982 | Goodsell |
| 4,433,204 A | 2/1984 | Wuertz |
| 4,443,654 A | 4/1984 | Flachbarth et al. |
| 4,458,460 A | 7/1984 | Kohaut |
| 4,477,694 A | 10/1984 | Kohaut |
| 4,496,790 A | 1/1985 | Spencer |
| 4,770,643 A | 9/1988 | Castellani et al. |
| 4,783,577 A | 11/1988 | Mohr |
| 4,827,080 A | 5/1989 | Castellani et al. |
| 4,864,078 A | 9/1989 | Bowman |
| 4,883,924 A | 11/1989 | Hadfield |
| 4,916,258 A | 4/1990 | Mohr |
| 4,978,318 A | 12/1990 | Wiley et al. |
| 5,003,127 A | 3/1991 | Sosinski et al. |
| 5,008,491 A | 4/1991 | Bowman |
| 5,023,396 A | 6/1991 | Bartee et al. |

(Continued)

FOREIGN PATENT DOCUMENTS

CA  2211066  4/1998

(Continued)

OTHER PUBLICATIONS

U.S. Appl. No. 11/897,055, filed Aug. 28, 2007, Galasso, et al.

(Continued)

Primary Examiner — Angel R Estrada
(74) Attorney, Agent, or Firm — McAndrews, Held & Malloy, Ltd.

(57) ABSTRACT

A recessed electrical outlet box for mounting in a floor. The outlet box includes a body made at least partially of intumescent material and configured to retain at least one receptacle and a retention structure receiving the body. The retention structure is configured to retain the body within a hole in the floor and contain the expansion of the intumescent material.

66 Claims, 25 Drawing Sheets

U.S. PATENT DOCUMENTS

| | | | |
|---|---|---|---|
| 5,030,795 A | 7/1991 | Domigan | |
| 5,032,690 A | 7/1991 | Bloom | |
| 5,049,702 A | 9/1991 | Hadfield | |
| 5,064,969 A | 11/1991 | Bloom | |
| 5,107,072 A | 4/1992 | Morgan | |
| 5,121,594 A | 6/1992 | Wuertz | |
| 5,122,069 A | 6/1992 | Brownlie et al. | |
| 5,160,808 A | 11/1992 | Hadfield | |
| 5,195,288 A | 3/1993 | Penczak | |
| 5,220,131 A | 6/1993 | Wuertz | |
| 5,237,128 A | 8/1993 | Wuertz | |
| 5,272,278 A | 12/1993 | Wuertz | |
| 5,393,930 A | 2/1995 | Wuertz | |
| 5,410,103 A | 4/1995 | Wuertz | |
| 5,422,434 A | 6/1995 | Wuertz et al. | |
| 5,460,542 A | 10/1995 | Castellani et al. | |
| 5,696,349 A | 12/1997 | Bera | |
| 5,705,772 A | 1/1998 | Brown | |
| 5,747,732 A | 5/1998 | Bera et al. | |
| 5,763,826 A | 6/1998 | Castellani et al. | |
| 5,783,774 A | 7/1998 | Bowman et al. | |
| 5,814,764 A | 9/1998 | Kohaut | |
| 6,018,126 A | 1/2000 | Castellani et al. | |
| 6,114,623 A | 9/2000 | Bonilla et al. | |
| D432,093 S | 10/2000 | Stout | |
| 6,175,078 B1 | 1/2001 | Bambardekar et al. | |
| 6,179,634 B1 | 1/2001 | Hull et al. | |
| 6,265,662 B1 | 7/2001 | Riedy et al. | |
| 6,307,152 B1 | 10/2001 | Bonilla et al. | |
| 6,353,180 B1 | 3/2002 | DeBartolo, Jr. et al. | |
| 6,417,446 B1 | 7/2002 | Whitehead | |
| 6,417,450 B1 | 7/2002 | Young | |
| 6,462,277 B1 | 10/2002 | Young et al. | |
| 6,483,028 B2 | 11/2002 | DeBartolo, Jr. et al. | |
| 6,495,753 B1 | 12/2002 | Goodsell et al. | |
| 6,545,215 B2 | 4/2003 | Young et al. | |
| 6,551,130 B2 | 4/2003 | Bonilla | |
| 6,552,262 B2 | 4/2003 | English et al. | |
| 6,612,081 B2 | 9/2003 | Cole et al. | |
| 6,696,640 B1 | 2/2004 | Castellani et al. | |
| 6,720,495 B2 | 4/2004 | Castellani et al. | |
| 6,750,395 B2 | 6/2004 | Stout et al. | |
| 6,854,226 B2 | 2/2005 | Cole et al. | |
| 7,053,296 B2 | 5/2006 | Drane et al. | |
| 7,082,729 B2 | 8/2006 | Cole et al. | |
| 7,166,798 B2 | 1/2007 | Cole | |
| 7,183,503 B2 | 2/2007 | Bowman et al. | |
| 7,271,351 B2 | 9/2007 | Drane | |
| 7,569,776 B2 * | 8/2009 | Jolly et al. | 174/481 |
| 7,674,990 B2 * | 3/2010 | Drane et al. | 174/483 |
| 7,847,199 B2 * | 12/2010 | Drane et al. | 174/483 |
| 2004/0099429 A1 | 5/2004 | Castellani et al. | |
| 2005/0050820 A1 | 3/2005 | Bowman | |
| 2005/0170690 A1 | 8/2005 | Cole | |
| 2005/0211455 A1 | 9/2005 | Cole | |
| 2007/0074890 A1 | 4/2007 | Halterman | |
| 2008/0135285 A1 * | 6/2008 | Drane et al. | 174/483 |

FOREIGN PATENT DOCUMENTS

| | | |
|---|---|---|
| DE | 1 105 939 | 5/1961 |
| FR | 1116385 | 5/1956 |
| GB | 836564 | 6/1960 |

OTHER PUBLICATIONS

U.S. Appl. No. 11/897,056, filed Aug. 28, 2007, Galasso, et al.
Hubbell Brochure entitled "Fire-Rated Poke-Through Flush Series"; dated 1989.
Raceway Components Brochure entitled "Flush Poke-Thru"; dated Oct. 1991.
Hubbell Brochure entitled "Fire-Rated Poke-Through Flush Furniture Feed"; dated 1992.
Raceway Components Brochure entitled "Four on the Floor and More . . . The Flush Poke-Thru Doubles It's Capacity"; dated 1994.
Walker Brochure for RC700 Series Flush Poke-Thru entitled "Place Power and Communication Services Where Needed"; dated 1997.
Walker Brochure entitled "Walker RCI RC900 Series Quad Poke-Thru"; dated 1997.
Walker Brochure for RC2001 Category 5 Flush Poke-Thru entitled "RC2001 Multiple Service Category 5 Flush Poke-Thru"; dated 1997.
Hubbell Brochure entitled "Fire-Rated Poke-Throughs"; dated 1998.
Walker Brochure entitled "RC3 Series Multiple Service Category 5 and Fiber Optic Flush Poke-Thru"; dated 1998.
Walker Brochure entitled "Flush Floor Box Series Covers for Use With Walker 880 Series Round Floor Boxes"; dated 1998.
Wiremold Brochure entitled "Walker RCI Poke-Thrus"; dated 1999.

* cited by examiner

RECESSED POKE-THROUGH FITTING

RELATED APPLICATIONS

This application is related to, and claims priority from, Provisional Application No. 60/840,911, filed Aug. 29, 2006, titled "Recessed Electrical Outlet Box," the complete subject matter of which is incorporated herein by reference in its entirety.

FIELD OF THE INVENTION

The present invention generally relates to an in-floor recessed electrical outlet box for carrying electrical equipment in the floors of buildings. More particularly, the present invention relates to a recessed in-floor outlet box that is removably retained in a hole in the floor by a bracket system, that receives a cable plug beneath the surface of the floor while physically and thermally sealing the outlet box, and that allows the cable to extend through a closed cover.

BACKGROUND OF THE INVENTION

In-floor fittings such as poke-thru fittings or floor boxes are installed in openings in concrete floors to provide electrical receptacles and communication/data receptacles (or jacks) at desired locations in buildings. Source power and signal cables loosely positioned in a plenum, which is located between the ceiling of the floor below and the floor above, may be pulled from the plenum and connected with or passed through the in-floor fitting for activation of services for and on the floor above.

In-floor fittings such as poke-through fittings may include fire-stop penetrations made of an intumescent material that expands when activated by a source of heat, such as a fire below the floor. The expansion of the intumescent material effectively forms a seal within the fitting to prevent heat penetration, both physically and thermally, into the fitting.

In-floor fittings may carry electrical and/or communication receptacles in a face-up orientation and positioned below the floor surface so as to permit the insertion of plugs completely inside the body of the fitting and under the surface of the floor with the plug cords extending out of the cover through an egress point. This configuration can be accomplished in a small footprint, but requires a tall profile. For example, a cross section of such a fitting includes the required radius to transition the cord from the top of the plug to the egress point in the cover, the height of the plug, the height of the receptacle, and the intumescent material below the receptacle. The cumulative height of these elements can easily measure between four and six inches.

Profiles of concrete floor designs vary greatly. Some are uniformly thick and are created by pouring concrete over a flat form. An alternate floor structure includes pouring concrete over a convoluted "W" shape steel deck. Concrete thicknesses for this structure can range from 2¼ inches over the crest of the "W" to more than 7 inches at the valley of the "W". Therefore, a tall in-floor fitting profile as detailed above can extend below the surface at of such floor at its shallowest points.

Because intumescent material will expand in all directions, it is best utilized if the direction of expansion is defined by boundaries. For in-floor fittings, the boundaries that limit the direction of expansion are the interior concrete walls and typically a steel plate at the base of the structure, which direct the expanding intumescent material into the interior of the floor hole. If the in-floor fitting extends below the slab in which it is positioned, the intumescent material may expand downward and separate from the fitting and thus diminish the effectiveness of the intumescent material.

Additionally, in-floor fittings typically include covers that allow cords to pass therethrough from plugs received within the fittings. Such covers may extend up above the surface of the floor, may have doors that open up above the surface of the floor, or include uneven surfaces.

SUMMARY OF THE INVENTION

Certain embodiments of the present invention provide a recessed electrical outlet box for mounting in a floor. The outlet box includes a body made at least partially of intumescent material and configured to retain at least one receptacle and a retention structure receiving the body. The retention structure is configured to retain the body within a hole in the floor and contain the expansion of the intumescent material.

Certain embodiments of the present invention provide a recessed electrical outlet box for mounting in a hole in a floor. The outlet box includes a body made at least partially of intumescent material configured to expand when activated by heat, and the body is configured to retain at least one receptacle. The outlet box includes a containment structure receiving at least a portion of the body. The containment structure extends out of the hole of the floor and is configured to contain the expansion of the intumescent material outside of the hole.

Certain embodiments of the present invention provide a recessed electrical outlet box for mounting in a floor. The outlet box includes an intumescent body configured to retain at least one receptacle and a cover configured to be mounted along the floor above said intumescent body such that an interior passage is defined within said intumescent body between said receptacle and said cover for receiving a plug with a cord within said intumescent body for connection to said receptacle. The intumescent body includes a sidewall extending along said interior passage from said receptacle to said cover.

Certain embodiments of the present invention provide a recessed electrical outlet box for mounting in a floor. The outlet box includes an insert body containing intumescent material that is configured to expand when activated by heat. The body retains at least one receptacle therein. The outlet box includes a retention structure configured to receive the insert body. The retention structure is configured to engage the wall of the hole in the floor to retain the insert body within the hole and to contain the expansion of the intumescent material. The outlet box includes a cover configured to be mounted along the floor and that is connected to the insert body such that an interior passage is defined within the insert body between the receptacle and the cover for receiving a plug with a cord within the insert body for connection to the receptacle. The cover is configured to be moved to a closed position about the passage and allow the cord to extend therethrough when in the closed position.

Certain embodiments of the present invention provide a recessed electrical outlet box for mounting in a floor. The outlet box includes an intumescent insert that is configured to expand when activated by heat. The intumescent insert retains at least one receptacle therein. The outlet box includes a retention structure configured to receive the intumescent insert. The retention structure has a wall configured to engage the wall of the hole in the floor to retain the intumescent insert within the hole and a base configured to contain the expansion of the intumescent insert. The outlet box includes a cover configured to be mounted along the floor and that defines an interior passage within the intumescent insert between the receptacle and the cover for receiving a plug with a cord within the intumescent insert for connection to the receptacle. The cover is configured to be moved to a closed position about the passage and allow the cord to extend therethrough when in the closed position.

Figure 1:
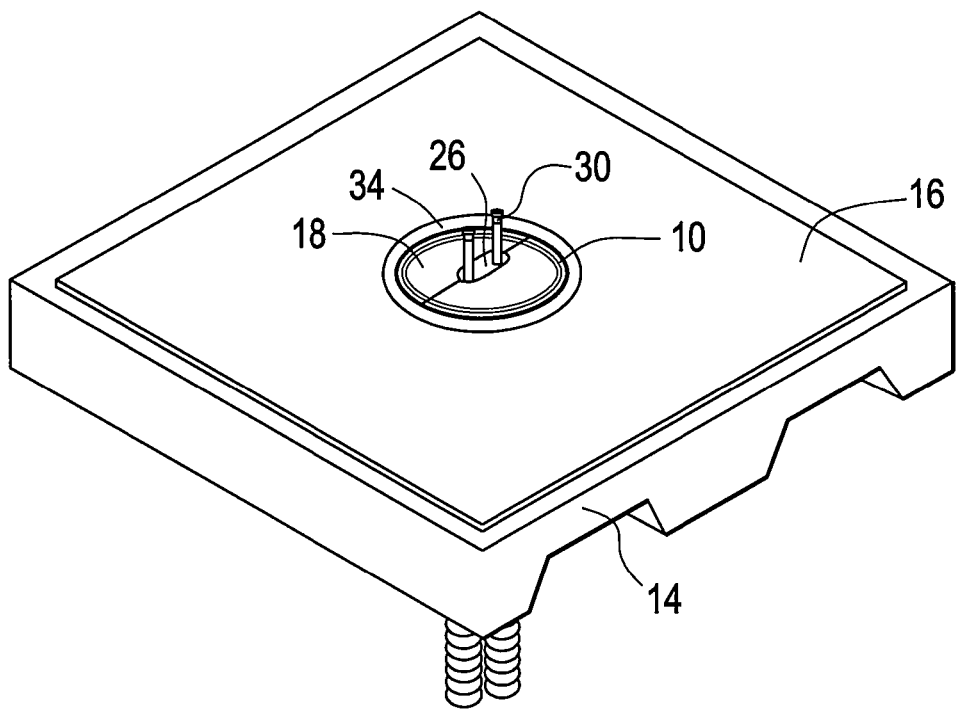
FIG. 1 illustrates a top isometric view of a recessed outlet box positioned in a floor slab according to an embodiment of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

FIG. 1 illustrates a top isometric view of a recessed in-floor fitting or outlet box 10 positioned in a floor slab 14 according to an embodiment of the present invention. By way of example only, the outlet box 10 is a poke-through fitting. The recessed outlet box 10 includes a cover 18 that defines an egress passage 26 through which cords 30 of electrical devices extend. The cover 18 is mounted to a circular floor flange 34 that sits along the floor 14. Alternatively, the flange 34 can have any number of other shapes besides circular. The flange 34 and cover 18 may be generally flush with the floor 14 or positioned slightly above or below the surface 16 of the floor 14. The floor slab 14 is concrete but the outlet box 10 may be used in floors made of other materials such as, by way of example only, wood or composite.

Figure 2:
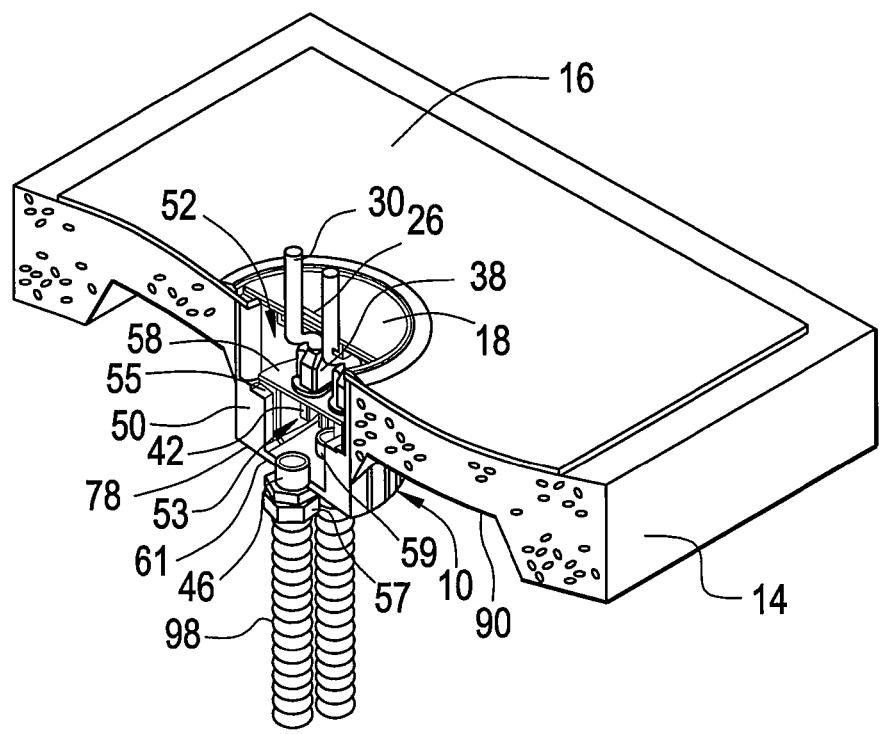
FIG. 2 illustrates an isometric cross-sectional view of the recessed outlet box of FIG. 1.

FIG. 2 illustrates an isometric cross-sectional view of the outlet box 10 of FIG. 1. The recessed outlet box 10 includes a cylindrical intumescent body or insert 50. The body 50 defines an upper interior region 52 and a lower interior region 53. The body 50 includes a ledge 55 extending along the interior surface of the body 50 and a base 57. The bottom 61 of the outlet 10 extends out below the floor 14. A semi-circle shaped cover plate 58 is mounted within the body 50 on the ledge 55 and carries electrical outlets or receptacles 42. The body 50 receives electrical plugs 38 in the upper interior region 52, and the plugs 38 are positioned below the surface 16 of the floor 14 with the cords 30 extending out through the egress passage 26 of the cover 18. The plugs 38 are connected to the electrical outlets 42 mounted in the cover plate 58. The electrical outlets 42 extend downward from the cover plate 58 into the lower interior region 53 and are positioned above conduit connectors 46 that are mounted within the base 57. The conduit connectors 46 are connected to conduits 98 and extend through holes 59 in the base 57. The conduit connectors 46 are threadably connected to the base 57. The conduits 98 carry cables and/or wires (not shown) that are connected to a power source. The cables and/or wires are connected to the electrical outlets 42 to activate the outlets 42. The outlet box 10 may also carry data/signal/communication receptacles instead of, or in addition to, power receptacles, and the conduits 98 may carry data/signal/communication wires and cables for connection to the data/signal/communication receptacles.

Figure 3:
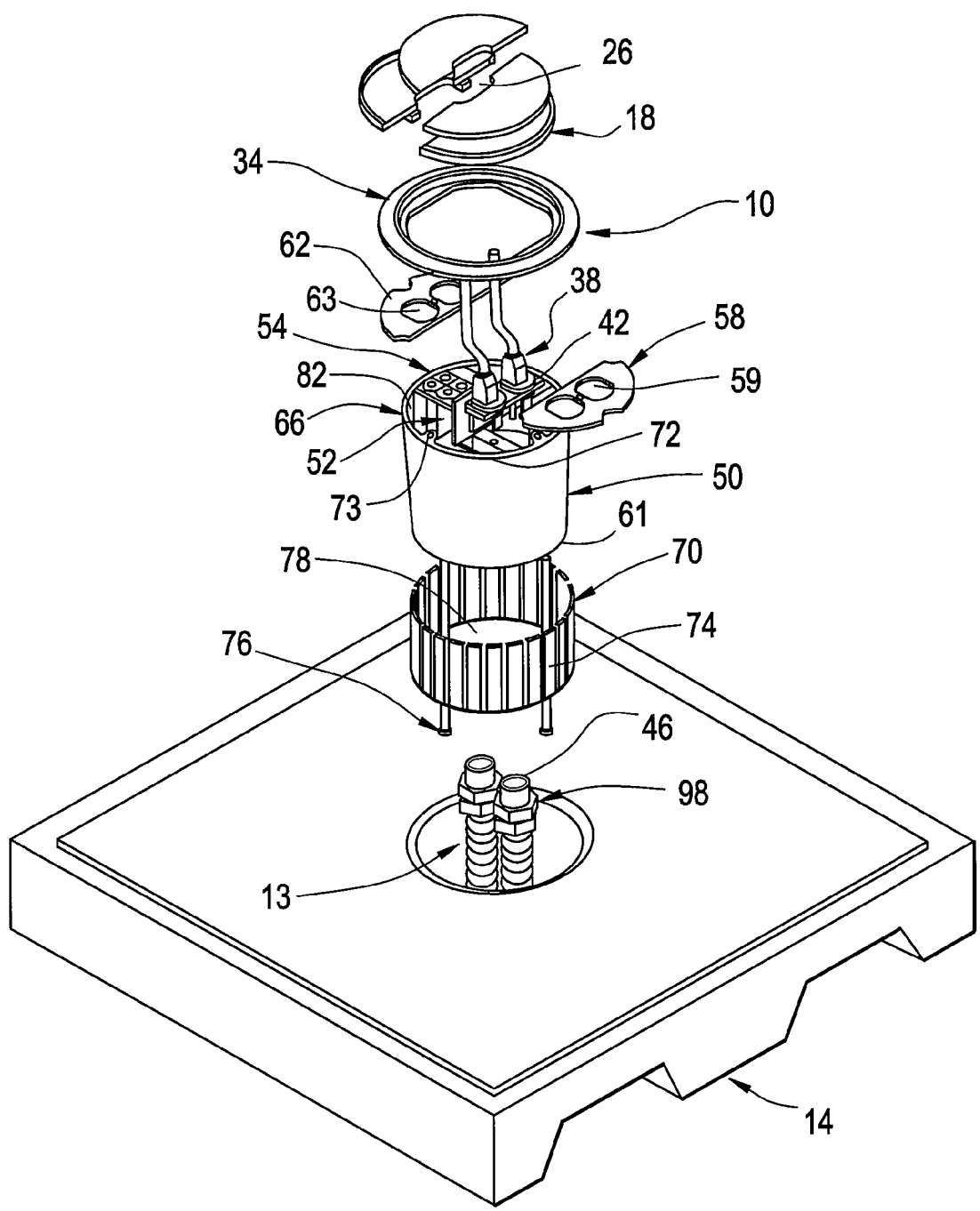
FIG. 3 illustrates an exploded isometric view of the recessed outlet box of FIG. 1.

FIG. 3 illustrates an exploded isometric view of the outlet box 10 of FIG. 1. The body 50 is a cylindrical one-piece molded body made of an intumescent material that acts as an expanding fire-stop material when activated by fire. The recessed outlet box 10 is fire classified. The outlet box 10 includes the cover plate 58 for carrying the power outlets 42 or duplex receptacle and a cover plate 62 for carrying communication and/or data and/or signal and/or audio-visual outlets or receptacles 54. The power outlets 42 receive the electrical plugs 38 (FIG. 2) while the communication outlets 54 are configured to receive communication and/or data and/or signal plugs and/or audio-visual jacks (not shown). The cover plate 58 has holes 59 for receiving the power outlets 42 and the cover plate 62 has holes 63 for receiving the communication receptacles 54. The cover plates 58 and 62 are mounted in the body 50 on the ledge 55 (FIG. 2) and retain the power outlets 42 and communication outlets 54, respectively, within the body 50. Alternatively, the body 50 may receive only signal outlets 54 or only power outlets 42 or any number of combinations of the two kinds of outlets. The rigid nature of the molded material of the body 50 allows for direct mounting of receptacles and communication devices in the body 50 to reduce the number of components in the design.

The power outlets 42 and communication outlets 54 are mounted within the body 50 to be positioned below a top end 66 of the body 50 such that, when the power plugs 38 (FIG. 2) and communication plugs are connected to the power outlets 42 and communication outlets 54, respectively, the power plugs 38 and data plugs are received within the upper interior region 52 of the body 50 and do not extend above the top end 66 of the body 50. The intumescent body 50 has upper walls 82 that extend between the ledge 55 (FIG. 2) and the underside of the floor flange 34 to define the finished upper interior region 52 which is visible to the user instead of the concrete interior of the hole in which the recessed outlet box 10 is mounted. The upper walls 82 made of intumescent material extend from the outlets 42 and 54 to the cover 18. Alternatively, the body 50 may include a molded intumescent lower section extending from the ledge 55 down to the base 57 (FIG. 2) and a molded polymeric upper section extending from the ledge 55 up to the top end 66. This construction enhances manufacturability and/or reduces cost without compromising the effectiveness of the intumescent material. Additionally, the upper section can be molded as a shell or support structure to maintain the required spacing between the lower section and the floor flange 34. This spacing in the interior region 52 accommodates reception of the plugs 38 within the outlet 10 and provides the necessary height within the interior region 52 to allow cords 30 to extend out of the interior region 52 and through the egress passage 26.

The recessed outlet box 10 also includes a cylindrical retaining cage or clip or retention or containment structure 70. By way of example only, the cage 70 may be made of metal or plastic. The cage 70 includes a wall made of a number of interconnected slats 74 and attachment fasteners 76 extending from a circular base 78. The cage 70 receives the body 50 therein and retains the body 50 within the hole 13 in the floor 14. The body 50 includes protrusions 72 extending along the interior thereof that have holes 73 for receiving the fasteners 76. When the body 50 is inserted into the cage 70, the fasteners 76 are aligned to extend through the holes 73 for connection to the flange 34. The flange 34 is configured to be secured to the fasteners 76 and thus secure the body 50, cage 70, and flange 34 together. Alternatively, one or more of the slats or fingers 74 may be extended to be connected to, and secure directly to, the floor flange 34 to secure the outlet box 10 together. Alternatively, the flange 34 may be configured to be connected to the body 50.

In operation, when the entire recessed outlet box 10 is mounted in the hole 13 in the floor 14, the cover 18 is removed, the plug or jack 38 (FIG. 2) is positioned within the interior 52 and plugged into an outlet (42 or 54 depending on the type of plug/jack). The cover 18 is then closed about the cord 30 (FIG. 2) of the plug 38 such that the cord 30 extends through the egress passage 26 in the cover 18, and the cover 18 is generally flush with the flange 34.

Referring to FIGS. 2 and 3, the profile of the recessed outlet box 10 may be sufficiently tall such that the bottom 61 of the recessed outlet box 10 extends below the floor 14. The base 78 of the cage 70 directs expanding intumescent material of the body 50 upward and inward when heat or fire causes the intumescent material to expand and prevents the intumescent material from expanding downward and out of the recessed outlet box 10. Likewise, the slats 74 of the cage 70 extend below a lower surface 90 of the floor 14 to contain the expansion of intumescent material and direct the expansion inward to the upper interior region 52 and lower interior region 53 of the outlet 10 such that little or no intumescent material expands out of the outlet box 10. The slats or fingers 74 of the cage 70 extend upwardly and outwardly at an angle from the base 78 such that when the cage 70 is inserted into the hole 13, the slats 74 are pushed inwardly by the interior wall of the hole and resistably engage the wall to create a bias against the interior concrete wall of the hole 13 to retain the recessed outlet box 10 in the hole 13 and prevent upward movement of the recessed outlet box 10 within the hole 13. Alternatively, the cage 70 may not be slotted, but may be continuous cylindrical structure, similar to a can. Additionally, the height of the cage 70 can be limited to only span the distance of the bottom 61 of the body 50 to the lower surface 90 of the concrete floor 14 instead of extending the entire height of the body 50. Alternatively, where the recessed outlet box 10 does not extend below the lower surface 90 of the floor 14, the base 78 prevents expansion of intumescent material downward.

Referring to FIGS. 2 and 3, the base 78 of the retaining cage 70 has holes for receiving and mounting the conduit connectors 46 to the recessed outlet box 10. The conduit connectors 46 are mounted within the cage 70 such that the cables and wires carried in the conduits 98 are connected to the outlets 42 and 54.

Figure 4:
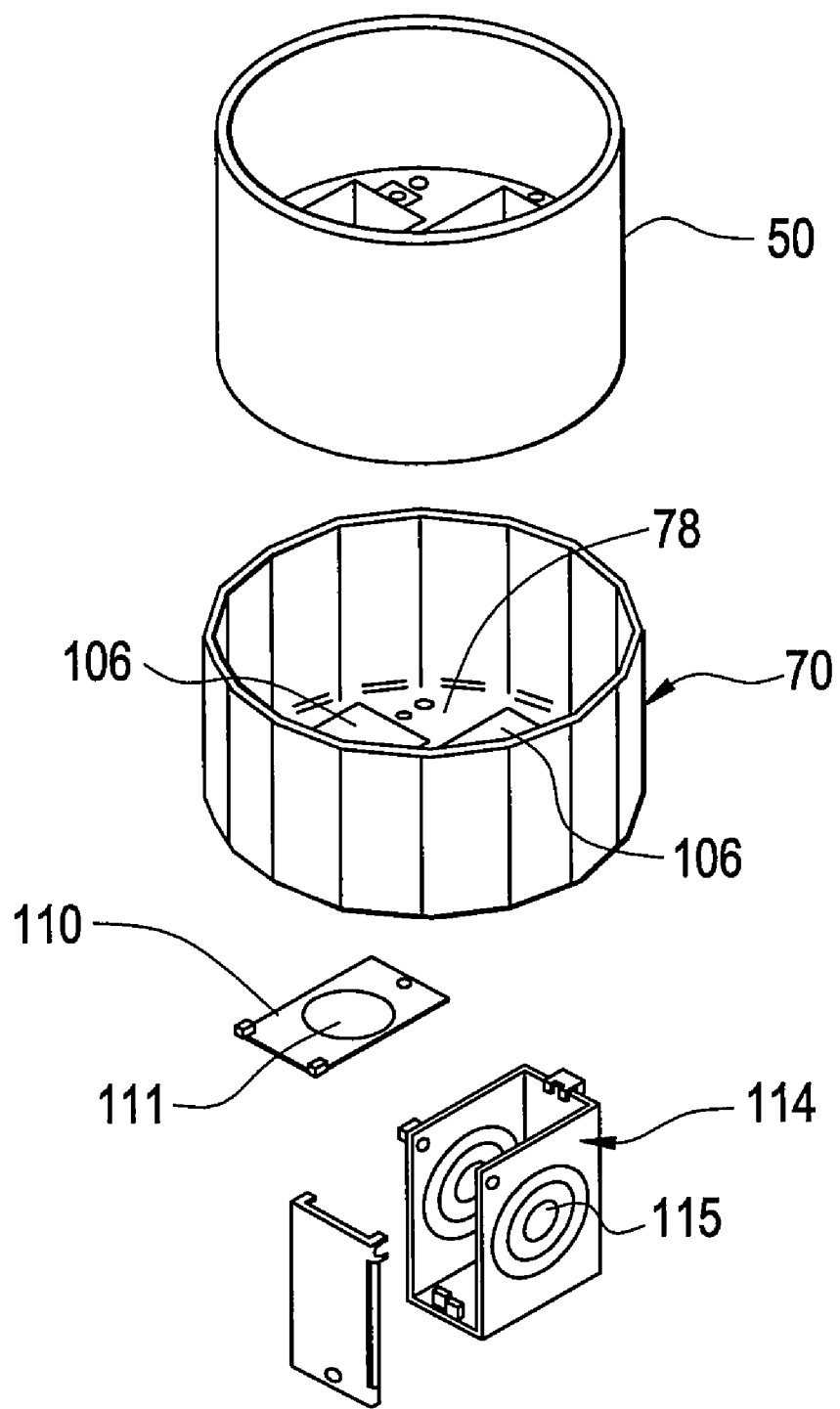
FIG. 4 illustrates an exploded isometric view of a recessed outlet box according to an embodiment of the present invention.

Referring to FIG. 4, alternatively, the base 78 of the cage 70 may include at least one large rectangular opening 106 that allows for wire connection to each connection device/receptacle positioned in the intumescent body 50. Alternatively, a plate 110 with a hole 111 adapted to receive a standard size conduit may be connected to the base 78 over one of the openings 106, and a conduit fitting, such as the conduit connector 46 shown in FIG. 2, may then be mounted to the plate 110 and extend through the hole 111. The wires in the conduit can then be connected to the receptacles. Alternatively, a junction box 114 for receiving wire terminations may be connected to the base 78 over one of the openings 106. The junction box 114 includes punchouts 115 that allow for conduits to be connected to the junction box 114 and the wires from the conduits to be routed through the opening 106 to the receptacles mounted in the intumescent body 50. The openings 106 may also be used without any covering to provide wire pass-through capacity for larger cables, plugs, etc.

Figure 5:
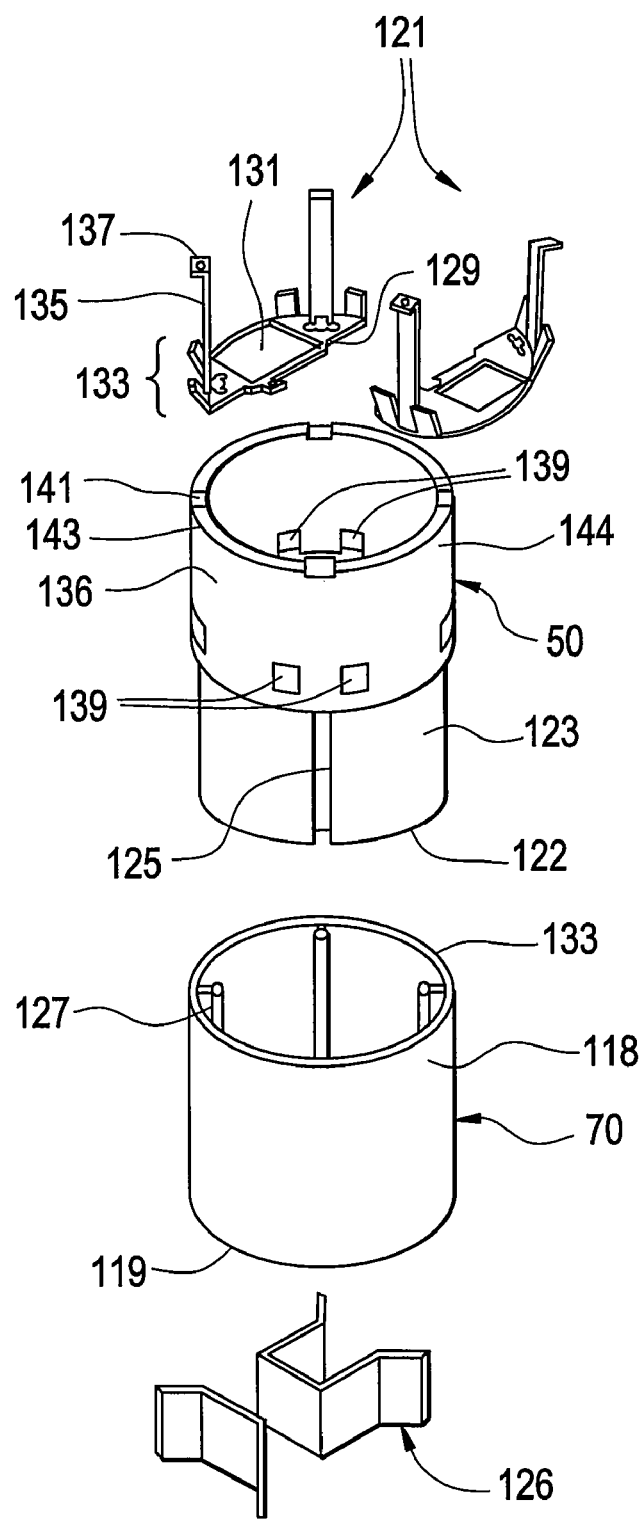
FIG. 5 illustrates an exploded isometric view of a recessed outlet box according to an embodiment of the present invention.

Referring to FIG. 5, alternatively, the cage 70 does not have slatted walls or a base but has a continuous wall 118. The cage 70 receives a lower portion 123 of the body 50 while an upper portion 136 of the body 50 rests on an upper rim 133 of the cage 70. The wall 118 of the cage 70 extends downward beyond the bottom 122 of the intumescent body 50 when the lower portion 123 of the body 50 is positioned in the cage 70 to provide an area for wire connections to be made below the body 50. The space between the bottom 122 of the body 50 and the bottom 119 of the cage 70 may be filled with a removable divider 126 to maintain the separation of power and data wiring within the cage 70 below the body 50. The cage 70 may also include removable plates (not shown) that are mounted underneath the divider 126 at the bottom 119 of the cage 70. The plates include multiple knock-out locations that correspond to the connection devices located in the intumescent body 50. The plates are shaped to cover the bottom 119 of the cage 70 and operate in a similar fashion to the plate 110 of FIG. 4 to allow the connection of wires to the connection devices. Any of the plates may be left off the recessed outlet box 10 to provide maximum wire pass through capacity. Additionally, the body 50 shown in FIG. 5 has grooves 125 along the lower portion 123 that are configured to receive legs 127 in the cage 70 to slidably retain the lower portion 123 of the body 50 within the cage 70. Alternatively, the cage 70 includes a base positioned above the bottom 119 of the cage that receives the bottom 122 of the body 50 within the cage 70 such that there is an open space in the cage 70 below the base to receive the divider 126.

The wall 118 of the cage 70 may be configured to be flexed inward when positioned within the hole of the floor in order to create a bias against the interior concrete wall of the hole to retain the recessed outlet box 10 in the hole and prevent upward movement of the recessed outlet box 10 within the hole. Alternatively, the cage 70 may include at least one barb extending therefrom that engages the wall of the hole to retain the outlet box 10 in the hole. The wall 118 may extend below the bottom surface of a floor and direct expanding intumescent material of the body 50 inward when heat or fire causes the intumescent material to expand such that little or no intumescent material expands out of the outlet box 10. A plate may be attached to the bottom 119 of the cage 70 to likewise prevent the intumescent material from expanding downward and out of the recessed outlet box 10.

The outlet box 10 also includes retention brackets 121 that are received within the body 50. Each retention bracket 121 includes a semicircular base 129 with an opening 131 for receiving a receptacle/connection device, two sets of barbs or prongs 133 and a set of legs 135 with tabs 137. The retention brackets 121 are detachably mounted in the body 50 by mounting the bases 129 on a ledge (not shown) in the body 50 and inserting the prongs 133 in holes 139 in the body 50 and inserting the tabs 137 on the legs 135 into gaps 141 along a rim 143 of the body 50. During assembly, the brackets 121 may be secured to the ledge by screws or fasteners, and receptacles/connection devices are mounted within the openings 131 of the bases 129 of the retention brackets 121. The flange 34 (FIG. 3) is then secured to the tabs 137 and a cover is mounted to the flange 34. When the assembled outlet box 10 is mounted in a hole in the floor, the prongs 133, which extend outside of an outer wall 144 of the body 50 and upwardly at an angle relative to the outer wall 144 of the body 50, resistably engage the wall of the hole to secure the outlet box 10 in the hole and prevent the outlet box 10 from being pulled back out of the hole. If the outlet box 10 later needs to be removed from the hole, the flange 34 is disconnected from the tabs 137 and one of the retention brackets 121 is removed from the body 50. By removing one of the retention brackets 121 while leaving the other one of the retention brackets 121 in the body 50, and therefore removing two sets of prongs 133 from engaging the wall of the hole, the outlet box 10 becomes loose enough within the hole that it may be removed. The removed bracket 121 may then later be reinstalled into the body 50. Alternatively, the outlet box 10 may include more than two brackets, and all the brackets are configured to be mounted within the body 50.

The embodiments described herein provide several benefits. Fire-rated poke throughs and fire stops are required to seal a hole in concrete both physically (preventing heat transfer by convection) and thermally (preventing heat transfer by conduction). The above embodiments provide such protections while at the same time allowing plugs to be received within the boxes in thin concrete floors without protruding above the floor.

In any of the above embodiments, a leveling means may be added in order to facilitate mounting the recessed outlet box for a concrete pour. Additionally, the embodiments of outlets described herein may receive other electronic devices within the recessed interior region of the outlet besides plugs and cables. By way of example only, the outlets may receive wireless electronic access points or speakers or any number of other electronic devices in the recessed interior region.

Figure 6:
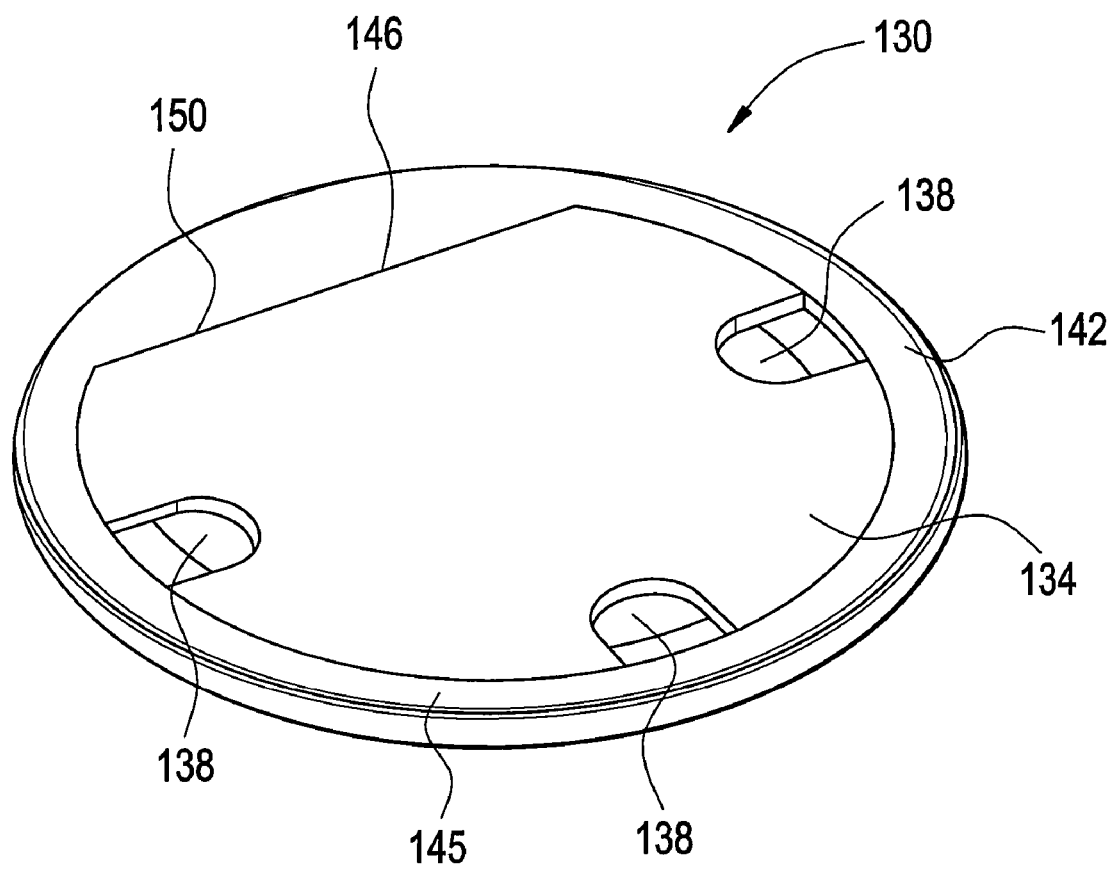
FIG. 6 illustrates a top isometric view of a cover according to an embodiment of the present invention.

FIG. 6 illustrates a top isometric view of a cover 130 in a closed position according to an embodiment of the present invention. The cover 130 may be used as an alternative to the cover 18 of the outlet 10 of FIG. 1 or may be used with other recessed electrical outlet box devices. The cover 130 is round and includes a door 134 mounted to a circular flange 142. The door 134 has semicircular gaps or cutouts 138 along the periphery 145 thereof and a flat edge 146 that corresponds to, and is hinged to, a flat edge 150 along the flange 142. The door 134 is hinged to the flange 142 such that the door 134 can fold back onto the flange 142 to provide access to the interior of an outlet box. The cutouts 138 allow for ingress and egress of cords through the door 134 when the door is in the closed position as shown in FIG. 6. The cutouts 138 may have any number of different shapes.

Figure 7:
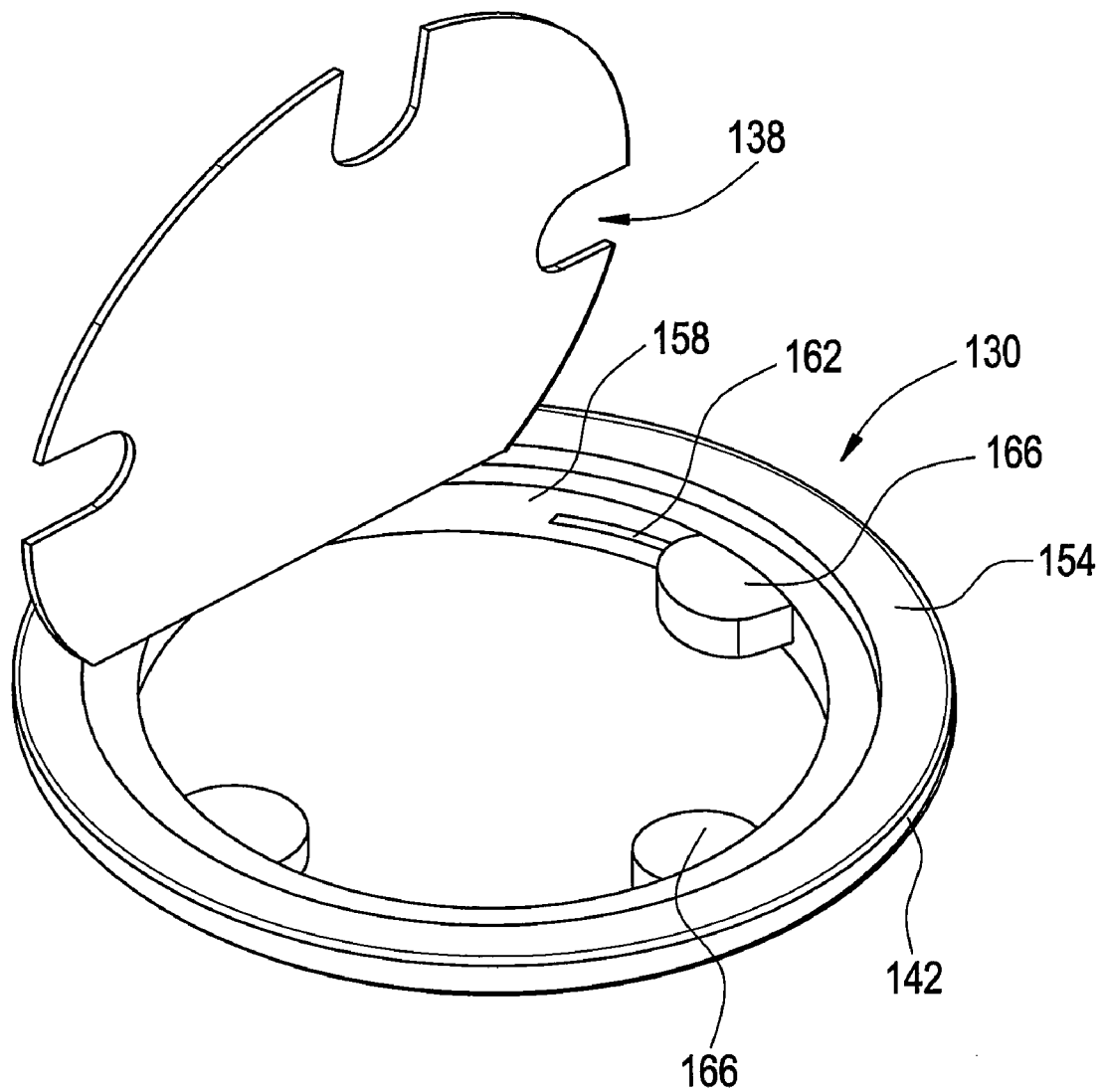
FIG. 7 illustrates a top isometric view of the cover of FIG. 6 in the open position.

FIG. 7 illustrates a top isometric view of the cover 130 of FIG. 6 in an open position. The flange 142 includes a circular rim 154 upon which the door 134 rests when closed. The flange 142 includes a cylindrical side wall 158 extending downwardly from the rim 154. The side wall 158 includes slots 162 through which extend semicircular movable tabs 166. The tabs 166 are configured to rotate laterally along the slots 162. The tabs 166 may move independently of each other. The tabs 166 may be moved within the slots 162 such that, when the door 134 is in the closed position, the tabs 166 block ingress/egress for cords through the cutouts 138. Alternatively, the tabs 166 may be moved within the slots 162 such that, when the door 134 is in the closed position, the tabs 166 do not block ingress/egress for cords through the cutouts 138. In operation, the door 134 is rotated from the closed position to the open position, at least one plug is inserted into the outlet box and connected to an outlet therein. At least one tab 166 is moved to an open position such that, when the door 134 is rotated to the closed position, the cord of the plug extends through the cutout 138 that corresponds to the open tab 166 and out of the outlet box. Alternatively, when the plug is disconnected and removed from the outlet box, the tab 166 may be moved back into a position where it aligns with a cutout 138 of the door 134 and prevents ingress/egress through the cutout 138 into the outlet box.

Figure 8:
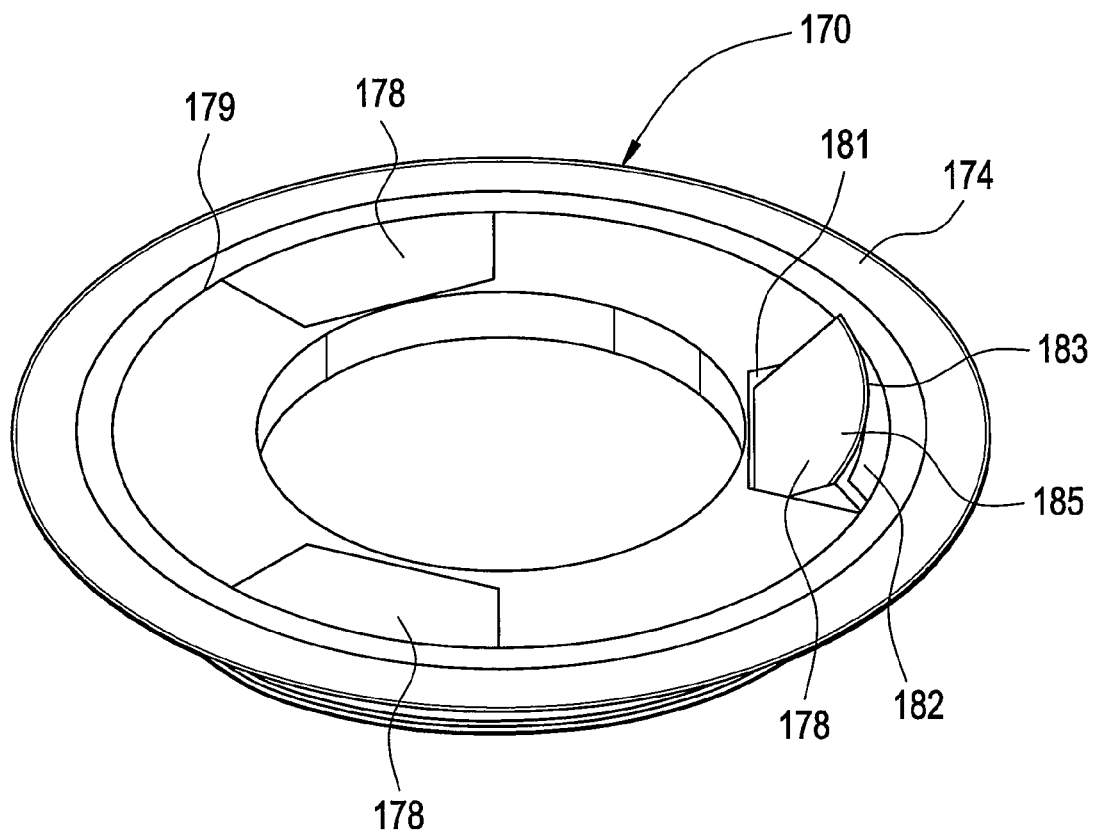
FIG. 8 illustrates a top isometric view of a cover according to an embodiment of the present invention.

FIG. 8 illustrates a top isometric view of a cover 170 in a closed position according to an embodiment of the present invention. The cover 170 may be used as an alternative to the cover 18 of the outlet 10 of FIG. 1 or may be used with other recessed electrical outlet box devices. The cover 170 is round and is mounted to a circular flange 174. The cover 170 has flip doors 178 along the periphery 179 of the cover 170. The doors 178 are pivotally positioned in cutouts 181 in the cover 170 and may be pivoted upward from the cover 170 within the cutouts 181 to open an ingress/egress passageway 182 and may be pivoted downward within the cutouts 181 to close the passageway 182. The doors 178 are snapably locked into place in the open position or the closed position.

Figure 9:
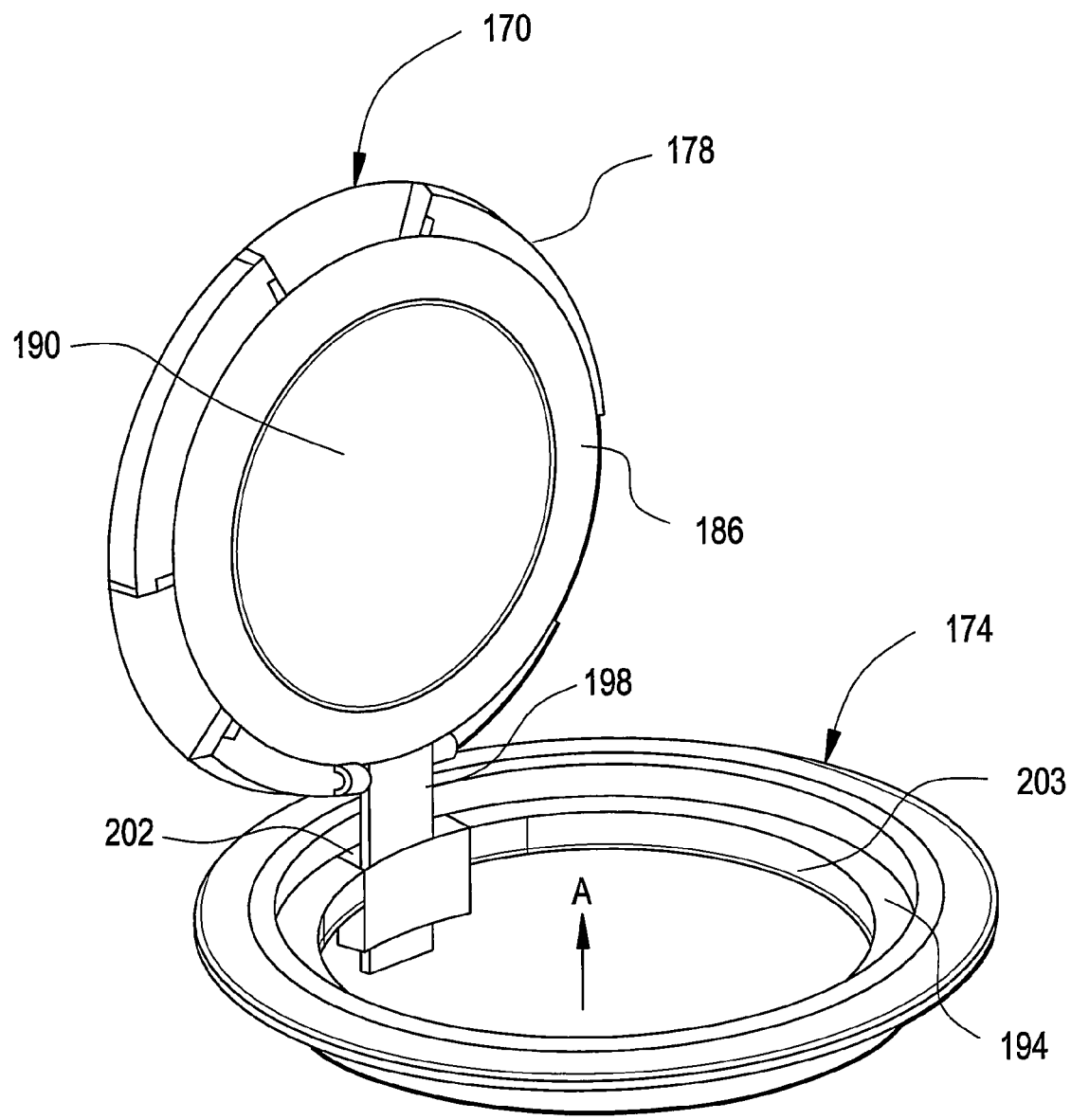
FIG. 9 illustrates a top isometric view of the cover of FIG. 8 in the open position.

FIG. 9 illustrates a top isometric view of the cover 170 of FIG. 8 in the open position. The flange 174 and cover 170 are connected by an articulating hinge 198. The hinge 198 is positioned in a slot 202 within the flange 174 that allows the hinge 198 to move straight upward in the direction of Arrow A within the slot 202 when the cover 170 is opened and thus allows the cover 170 to be rotated at least 180 degrees and lay flat on the floor when in the open position. The entire articulating hinge 198 remains under the cover 170 without any portion of the hinge 198 extending out above the cover 170 when the cover 170 is in the closed position. In this way, the top surface of the cover 170 is generally flush when the cover 170 is in the closed position. The flange 174 includes a circular rim 194 upon which the cover 170 rests when closed. The cover 170 includes a gasket 186 along the bottom side 190 thereof. The gasket 186 is one continuous ring that contacts the rim 194 when the cover 170 is closed. With the cover 170 in the closed position, the gasket 186 compresses radially to provide a continuous, liquid-tight seal between the cover 170 and an inner vertical wall 203 of the flange 174.

In operation, the cover 170 is rotated from the closed position to the open position and at least one plug is inserted into the outlet box and connected to an outlet therein. At least one door 178 is moved to an open position such that, when the cover 170 is rotated to the closed position, the cord of the plug extends through the passageway 182 of the open door 178. The doors are opened by pushing bottom sides 183 of the doors 178 upward to move the doors 178 to the open position. The gasket 186 is compressible such that the gasket 186 allows the cord to extend through the passageway 182 of an open door 178 when the cover 170 is in the closed position flush with the flange 174. The doors 178 do not need to be independently water-sealed because the gasket 186 is located below the passageways 182. Alternatively, when the plug is disconnected and removed from the outlet box, the door 178 may be moved back to the closed position to close the passageway 182 and prevent ingress/egress through the passageway 182 into the outlet box. The doors 178 are closed by pushing down on top sides 185 of the doors 178 until the doors 178 are in the closed position.

Figure 10:
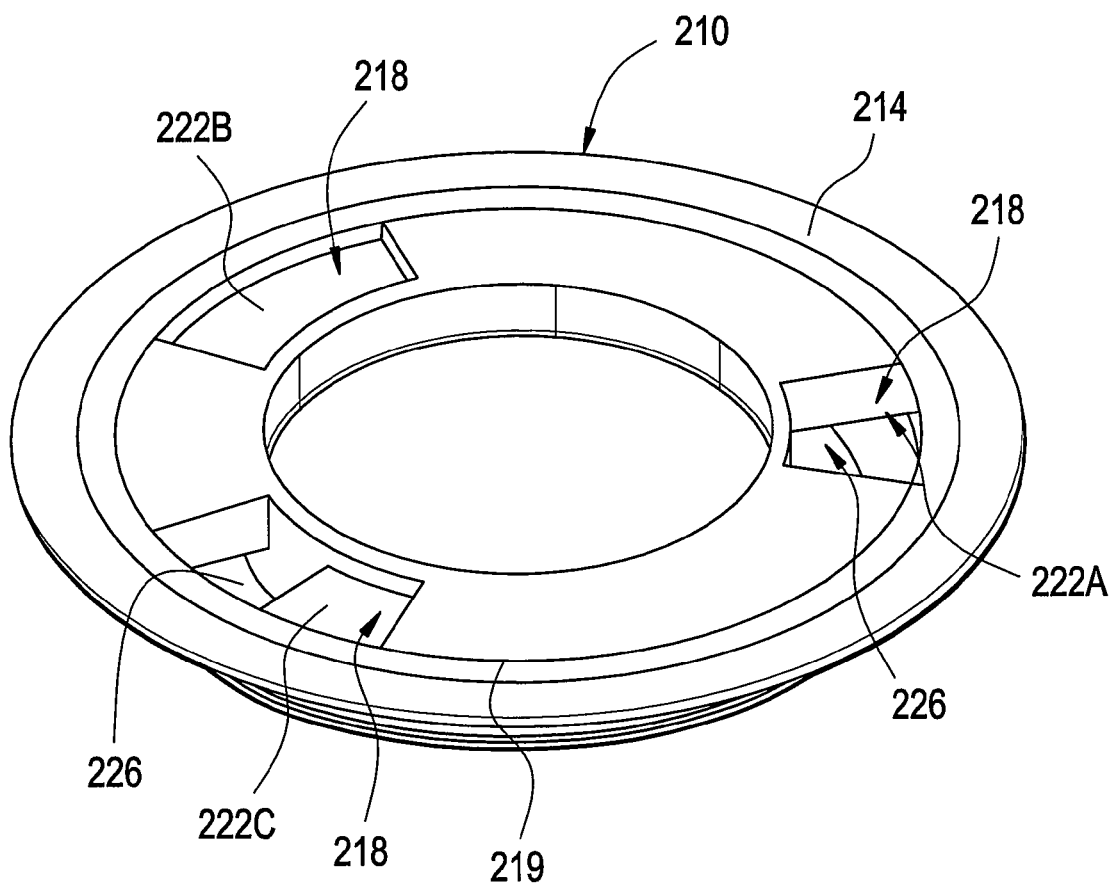
FIG. 10 illustrates a top isometric view of a cover according to an embodiment of the present invention.

FIG. 10 illustrates a top isometric view of a cover 210 in a closed position according to an embodiment of the present invention. The cover 210 may be used as an alternative to the cover 18 of the outlet 10 of FIG. 1 or may be used with other recessed electrical outlet box devices. The cover 210 is round and is mounted to a circular flange 214. The cover 210 has cutouts 218 along the periphery 219 of the cover 210. The cover 210 includes doors 222 positioned beneath the cutouts 218. The doors 222 are configured to move or slide axially underneath the cover 210 to an open position that exposes an ingress/egress passageway 226 through the cutout 218 into the outlet interior. The doors 222 are shown in varying positions. For example, door 222a is open, door 222b is closed, and door 222c is partially open. Thus, the doors 222 do not create a protrusion above the surface of the cover 210 when in the open position. The doors 222 may move independently of each other.

The cover 210 may include the articulating hinge and gasket as shown in the cover for FIGS. 8 and 9. In operation, the cover 210 is rotated from the closed position to an open position and at least one plug is inserted into the outlet box and connected to an outlet therein. At least one door 222 is slid to an open position such that, when the cover 210 is rotated to the closed position, the cord of the plug extends through the cutout 218 and into a passageway 226 of the open door 222. The doors 222 may include a mechanism for self-closing the doors 222. By using the self-closing mechanism, the doors 222 may be locked in the open position when the cover 210 is in the open position. The doors 222 then automatically close about the cords that are extending through the passageways 226 when the cover 210 is moved to the closed position. For example, the doors 222 may be spring-loaded wherein the doors 222 may lock in the open position with a feature that will automatically close the doors 222 when the cover 210 has been completely closed.

The gasket on the cover 210 is compressible such that the gasket allows the cord to extend through the passageway 226 of the open door 222 when the cover 210 is in the closed position flush with the flange 214. The doors 222 do not need to be independently water-sealed because the gasket is located below the passageways 226. Alternatively, when the plug is disconnected and removed from the outlet box, the door 222 may be slid back to close the passageway 226 formed by the cutout 218 and prevent ingress/egress through the passageway 226 into the outlet box.

Figure 11:
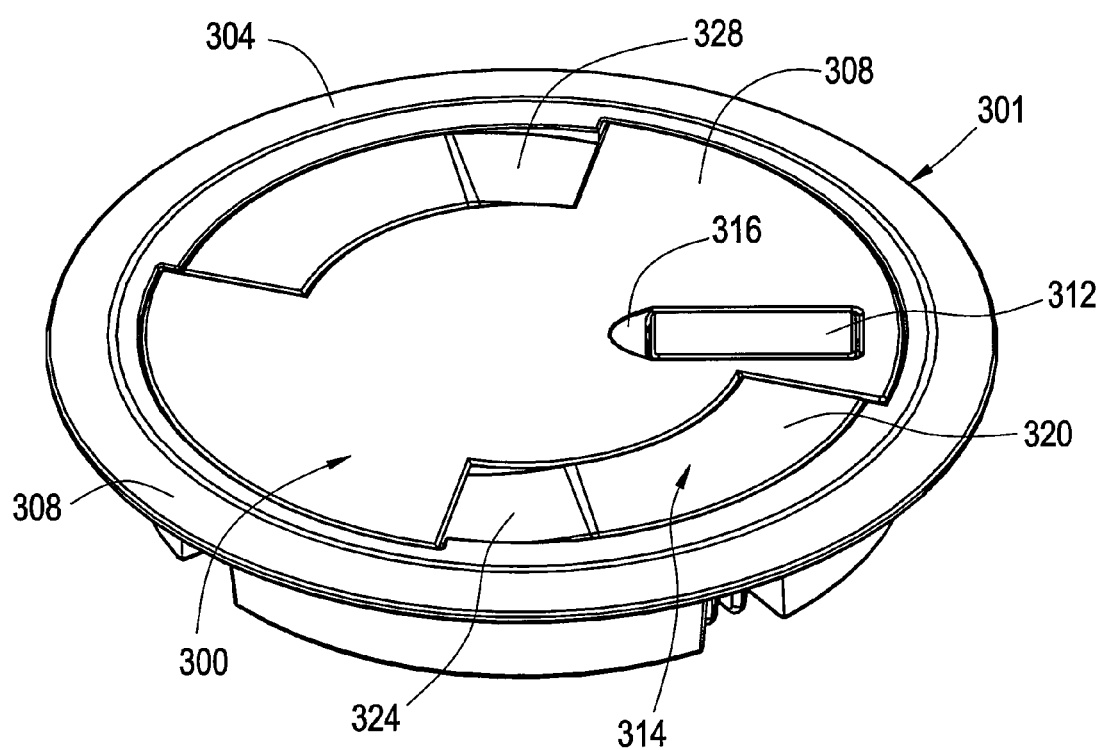
FIG. 11 illustrates a top isometric view of a cover assembly in a closed position according to an embodiment of the present invention.

FIG. 11 illustrates a top isometric view of a cover assembly 301 according to an embodiment of the present invention. The cover assembly 301 may be used as an alternative to the cover 18 of the outlet 10 of FIG. 1 or may be used with other recessed electrical outlet box devices. The cover assembly 301 includes a cover 300 in a closed position within a flange 304. The cover 300 is mounted within a rim 306 of the circular flange 304. The cover 300 includes a top plate 308 having a rotatable latch 312 and a divot 316 proximate the latch 312 to allow an operator to access the latch 312. The plate 308 also includes curved sliding doors 314, which are shown in a closed position. The doors 314 include a generally flat top portion 320 and an inclined ramp portion 324. The ramp portions 324 of the doors 314 extend under the top plate 308 to define small angled gaps 328 along the cover 300. The rim 306, top plate 308, and top portion 320 of the doors 314 are generally aligned along a plane and are generally flush when the doors 314 are in the closed position. The cover 300 is configured to be mounted to a recessed outlet box and be positioned along the surface of a floor. The cover 300 is configured to be opened such that plugs may be received within the outlet box for connection to receptacles/connection devices and the doors 314 are configured to be opened to allow cords to extend from the plugs outside of the outlet box. By way of example only, the top plate 308, doors 314, and flange 304 may be made of metal or a hard plastic.

Figure 12:
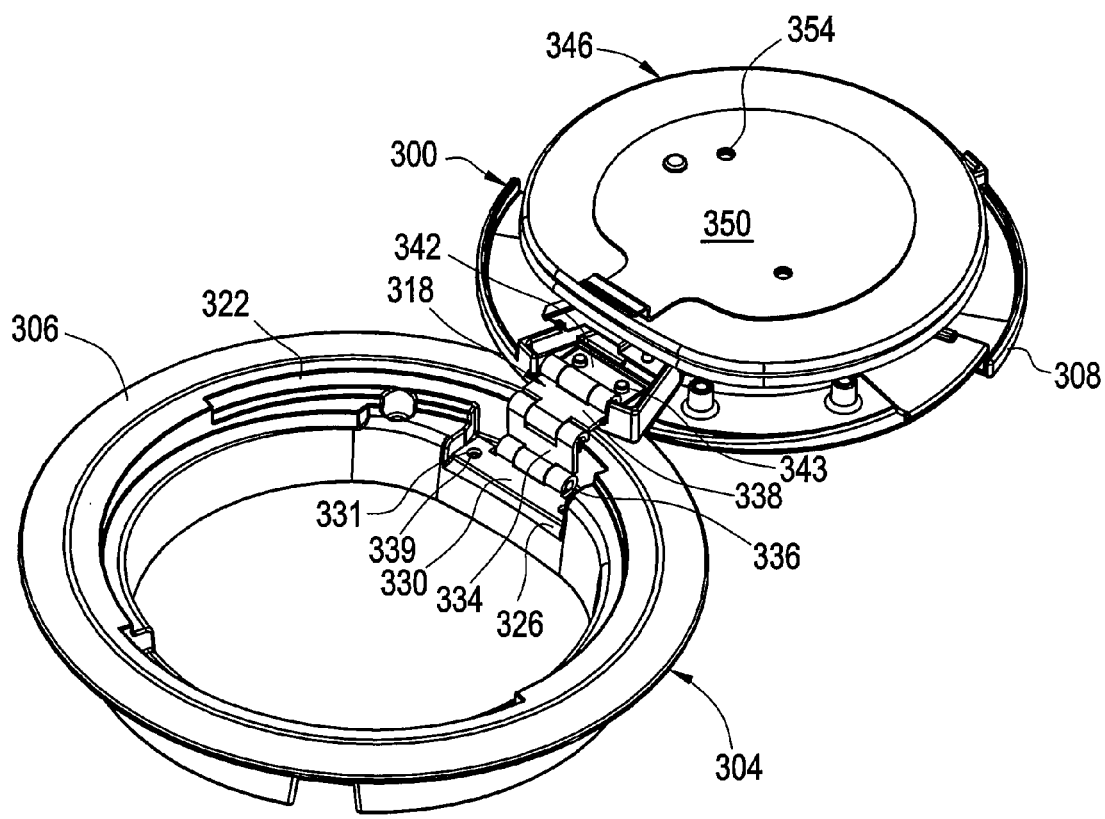
FIG. 12 illustrates the cover assembly of FIG. 11 in an open position.

FIG. 12 illustrates the cover 300 of FIG. 11 in an open position with respect to the flange 304. The cover 300 is connected to the flange 304 by an articulating hinge 318. The articulating hinge 318 includes a first hinge bracket 330 rotatably connected to a second hinge bracket 334 by a pin 336, which is rotatably connected to a third hinge bracket 338 by a pin 336, which is rotatably connected to a fourth hinge bracket 342 by a pin 336. The flange 304 includes an interior vertical wall 322 extending downward from the rim 306 and a ledge 326 formed perpendicularly to the wall 322. The ledge 326 includes bosses 339 that are received in holes 331 in the first hinge bracket 330 and that deform within the holes 331 to secure the bracket 330 to the ledge 326. Alternatively, the first hinge bracket 330 may be secured to the ledge 326 by screws or fasteners. The fourth hinge bracket 342 is connected to the top plate 308 of the cover 300 by screws or fasteners 343. The hinge brackets 330, 334, 338, 342 rotate with respect each other such that the cover 300 can rotate more than 90 degrees or even more than 180 degrees relative to the flange 304 between the open position and the closed position (FIG. 11) where the cover 300 lays on the floor surrounding the flange 304. When the cover 300 is rotated at least 180 degrees from the closed position to the open position such that the cover 300 is resting on the floor surface surrounding the flange 304, the cover 300 is less likely to be damaged than if the cover 300 only opens up 90 degrees and is perpendicular to the floor. Additionally, the entire articulating hinge 318 remains under the cover 300 without any portion of the hinge 318 extending out above the cover 300 when the cover 300 is in the closed position (FIG. 11). In this way, the top surface of the cover 300 is generally flush when the cover 300 is in the closed position. Alternatively, the cover 300 may be connected to the flange 304 by some other articulating hinge that allows for 180 degree rotations, such as the articulating hinge 198 shown in FIG. 9.

The cover 300 includes a flexible circular gasket 346 connected thereto by a gasket plate 350. The gasket plate 350 is secured to the top plate 308 by screws 354.

Figure 13:
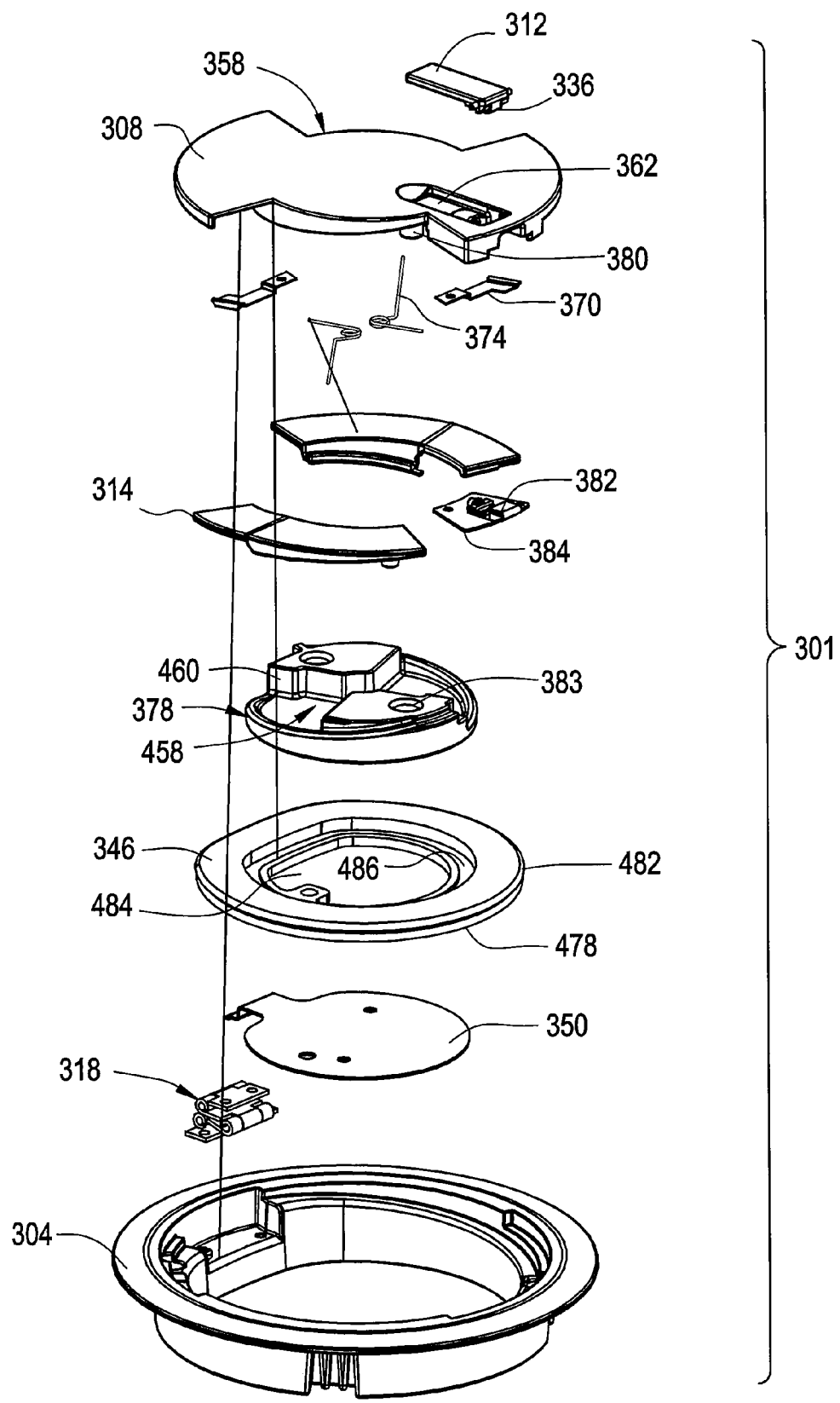
FIG. 13 illustrates an exploded top isometric view of the cover assembly of FIG. 11.

FIG. 13 illustrates an exploded top isometric view of the cover assembly 301. The top plate 308 includes curved gaps 358 along the periphery thereof that are configured to receive the doors 314. The top plate 308 includes a slot 362 for receiving the generally rectangular latch 312. The latch 312 includes a latch pin 366 for retaining the latch 312 within the slot 362.

The cover 300 includes slide catches 370 that are mounted underneath the top plate 308 and are configured to hold the doors 314 open when the cover 300 is at least partly open. The cover 300 further includes torsion springs 374 that are mounted underneath the top plate 308 and that are configured to force the doors 314 into the closed position when the cover 300 is in the closed position. The cover 300 includes a lower plate 378 that is configured to be secured to the top plate 308 and the gasket 346 and gasket plate 350 are secured to the lower plate 378. The lower plate 378 may be made of metal or plastic. The top plate 308 includes posts 380 that are received in holes 383 in the lower plate 378 to align the lower plate 378 with the top plate 308. The cover 300 also includes a latch tongue 382 that is mounted underneath the top plate 308 by a latch plate 384 and that engages the flange 304 to secure the cover 300 in the closed position with respect to the flange 304. The articulating hinge 318 is shown in the configuration that allows for the cover 300 to be in the closed position when connected to the flange 304 by the articulating hinge 318.

Figure 14:
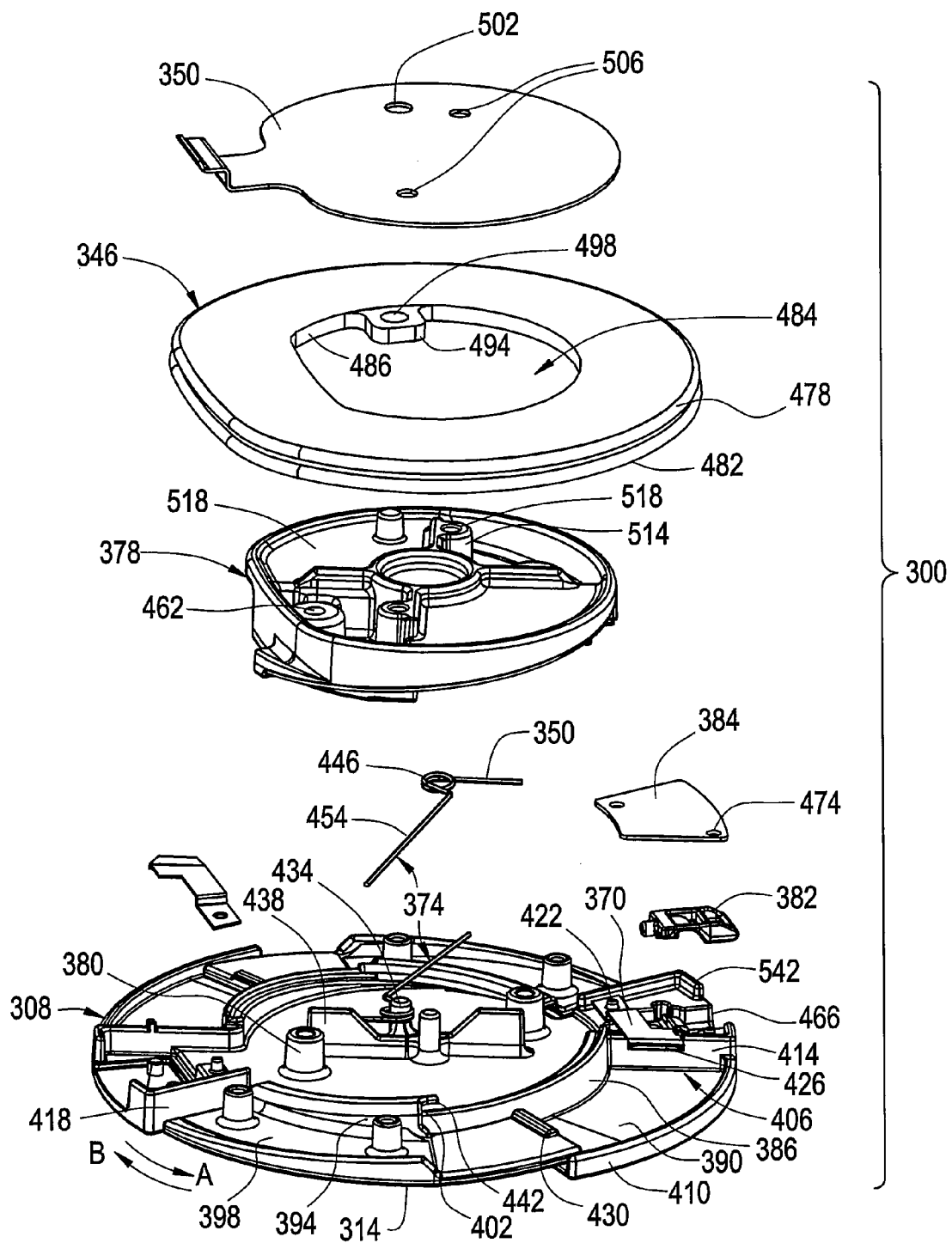
FIG. 14 illustrates an exploded bottom isometric view of the cover of FIG. 11.

FIG. 14 illustrates an exploded bottom isometric view of the cover 300. The top plate 308 has helical ramps 386 extending from a bottom surface 390 thereof. The doors 314 have helical side walls 394 extending from bottom sides 398 thereof. The side walls 394 include skirts 402 that slidably receive the helical ramps 386 to retain the side walls 394 of the doors 314 to the helical ramps 386 of the top plate 308. The doors 314 slide along the helical ramps 386 in the direction of arrow A. The doors 314 are positioned in the gaps 358 (FIG. 13) of the top plate 308 when in the closed position. The top plate 308 includes slots 406 along the bottom surface 390 thereof and situated between the helical ramps 386 and outer rims 410 for receiving the doors 314. As the doors 314 slide along the helical ramps 386 in the direction of Arrow A from the gaps 358 toward the slots 406, the doors 314 slide up the incline of the helical ramps 386 and are moved further away from the top plate 308 such that the doors 314 slide underneath the top plate 308 into the slots 406.

The slots 406 are further defined by end walls 414 extending from the bottom surface 390 which block rotation of the doors 314 in the direction of arrow A along the slots 406. Similarly, the top plate 308 includes gap end walls 418 extending from the bottom surface 390 which block rotation of the doors 314 in the direction of arrow B about the helical ramps 386 into the gaps 358.

The top plate 308 includes posts 422 to which the slide catches 370 are flexibly secured. The slide catches 370 include rounded hooks 426 that extend over the end walls 414 to catch and retain textured tabs 430 extending from the bottom sides 398 of the doors 314 when the doors 314 engage the end walls 414. The slide catches 370 may be made of a flexible metal or plastic.

The top plate 308 includes posts 434 to which the torsion springs 374 are secured and panels 438 positioned alongside the posts 434. The doors 314 also include fingers 442 extending from the skirts 402. Each torsion spring 374 is made of a flexibly resistant material and includes a ring 446 from which a first arm 450 and a second arm 454 extend approximately perpendicular to each other. The torsion springs 374 are secured to the posts 434 such that each torsion spring 374 is compressed between a panel 438 and a door 314 with the first arm 450 engaging the panel 438 and the second arm 454 secured under the finger 442 to engage the door 314. The compressed torsion spring 374 thus is spring-loaded to push the finger 442, and therefore the door 314, in the direction of arrow B to secure the door 314 against the gap end wall 418 in the closed position.

The lower plate 378 is mounted onto the posts 380 of the top plate 308 and over the panels 438, posts 442 and torsion springs 374. As shown in FIG. 13, the lower plate 378 has recessed sections 458 on its top side 460 for receiving the panels 438, posts, 442 and torsion springs 374 and holes 383 for receiving the posts 380. Referring to FIG. 14, the lower plate 378 has a hole 462 that aligns with one of the posts 380 in order that the lower plate 378 may be secured to the post 380 by a screw or other fastener.

Figure 15:
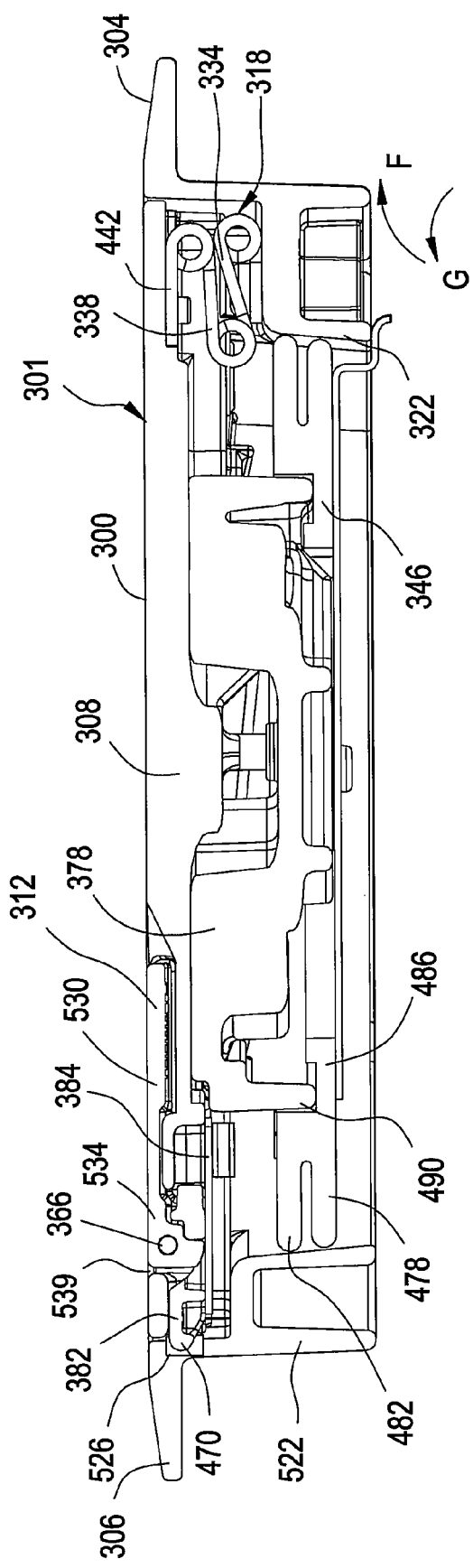
FIG. 15 illustrates a cross-sectional side view of the cover assembly of FIG. 11.
Figure 18:
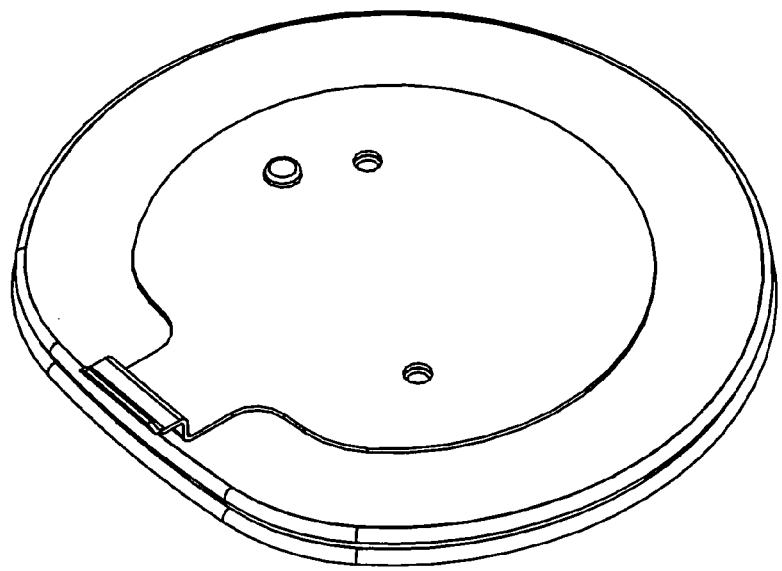
FIG. 18 illustrates a bottom isometric view of the top plate of the cover assembly of FIG. 11 with doors in the closed position.
Figure 18:
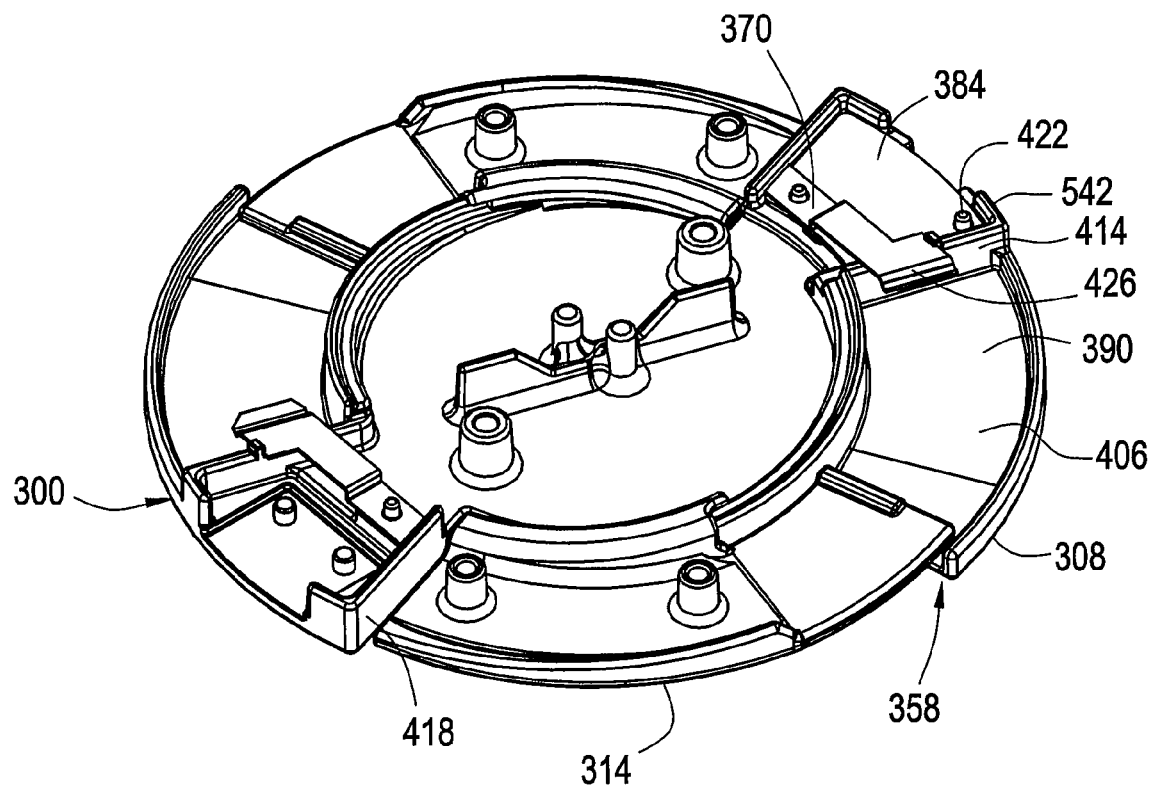

Referring to FIGS. 14, 15, and 18 the latch tongue 382 fits in a gap 466 on the bottom surface 390 of the top plate 308. The latch tongue 382 includes a tab 470 that extends out beyond the outer rim 410 of the top plate 308 when the latch tongue 382 is in the gap 466. The latch plate 384 includes holes 474 configured to receive posts or fasteners. The latch plate 384 is received in a frame 542 along the bottom surface 390 of the top plate 308. The holes 474 in the latch plate 384 receive the posts 422 within the frame 542 such that the latch plate 384 is secured to the top plate 308 to retain the latch tongue 382 in the gap 466. One of the slide catches 370 is mounted on one of the posts 422 on top of the latch plate 384.

The gasket 346 is generally circular in shape and includes parallel first and second rings or layers 478 and 482 of flexible material formed with each other and defining a cavity 484. Alternatively, the gasket 346 may include a single layer or more than two layers. Referring to FIGS. 13 and 15, the first ring 478 has a smaller inner diameter than the second ring 482 and defines a ledge 486 that extends into the cavity 484 of the gasket 346. Returning to FIGS. 14 and 15, the lower plate 378 is received in the cavity 484 and is mounted on the ledge 486 such that the second ring 482 fits around an outer wall 490 of the lower plate 378. The first ring 478 includes a tab 494 with a hole 498 that extends from the ledge 486 into the cavity 484. When the gasket 346 is mounted to the lower plate 378, the hole 498 is aligned with, and receives, an alignment post 488 extending from the a bottom side 518 of the lower plate 378 such that the gasket 346 is properly aligned with the lower plate 378. The gasket plate 350 includes a hole 502 that also receives the alignment post 488 of the lower plate 378 such that gasket plate 350 is properly aligned with the lower plate 378 and gasket 346. The gasket plate 350 includes fastener holes 506, which are aligned with holes 510 in posts 514 extending from the bottom side 518 of the lower plate 378 and which allow for the gasket plate 350 to be secured to the lower plate 378 by screws or fasteners and sandwich the gasket 346 between the gasket plate 350 and the lower plate 378.

FIG. 15 illustrates a cross-sectional side view of the cover assembly 301 of FIG. 11. The cover 300 is in the closed position. The articulating hinge 318 is in a closed position. The latch 312 includes a body 530 that is positioned in the slot 362 (FIG. 13) in the top plate 308 and a head 534 that extends through a hole 539 in the top plate 308. The head 534 is connected to the latch tongue 382 by the latch pin 366 and the latch tongue 382 is positioned between the latch plate 384 and the top plate 308. When the latch body 530 is in the slot 362, the latch tongue 382 extends out beyond the periphery of the top plate 308 and is in the locked position. An outer wall 522 extends downward from the rim 306 of the flange 304. The outer wall 522 includes a slot 526 at a point where the outer wall 522 and rim 306 intersect proximate the latch 312 that receives the latch tongue 382. When the tab 470 of the latch tongue 382 is positioned in the slot 526, the cover 300 is secured in the closed position to prevent the cover 300 from being opened.

When the cover 300 is in the closed position, the gasket 346 engages the interior vertical wall 322 and deforms slightly to form a radial seal along the wall 322. The seal formed by the gasket 346 prevents liquid from leaking past the flange 304 into an in-floor fitting to which the cover assembly 301 is mounted. The two rings 478 and 482 of the gasket 346 provide a double seal within the flange 304. The double seal helps further prevent leakage if one of the rings 478 and 482 does not form a tight seal with the wall 322 due to variations in tolerance along the wall 322. Alternatively, if the gasket 346 includes more than two rings, the gasket 346 can form more than two seals with the wall 322. The two rings 478 and 482 of the gasket 346 may be made of the same material such as a flexible rubber or plastic material. Alternatively, the rings 478 and 482 may each be made of a different material. By way of example only, the first ring 478 may be made of a flexible absorbent material, such as open cell foam, and the second ring 482 may be made of a flexible sealing material such as rubber, neoprene, or silicone. Water that leaks into the cover 300 beads up on the silicone second ring 482, and any water that leaks past the second ring 482 is absorbed by the first ring 478. Alternatively, the first ring 478 may be made of silicone or another water-resistant material and the second ring 482 may be made of open cell foam or another absorbent material to prevent water from leaking into a recessed in-floor fitting. Alternatively, the gasket 346 may include a single ring that is a single material or a single ring that is formed of at least two layers of different materials.

Figure 16:
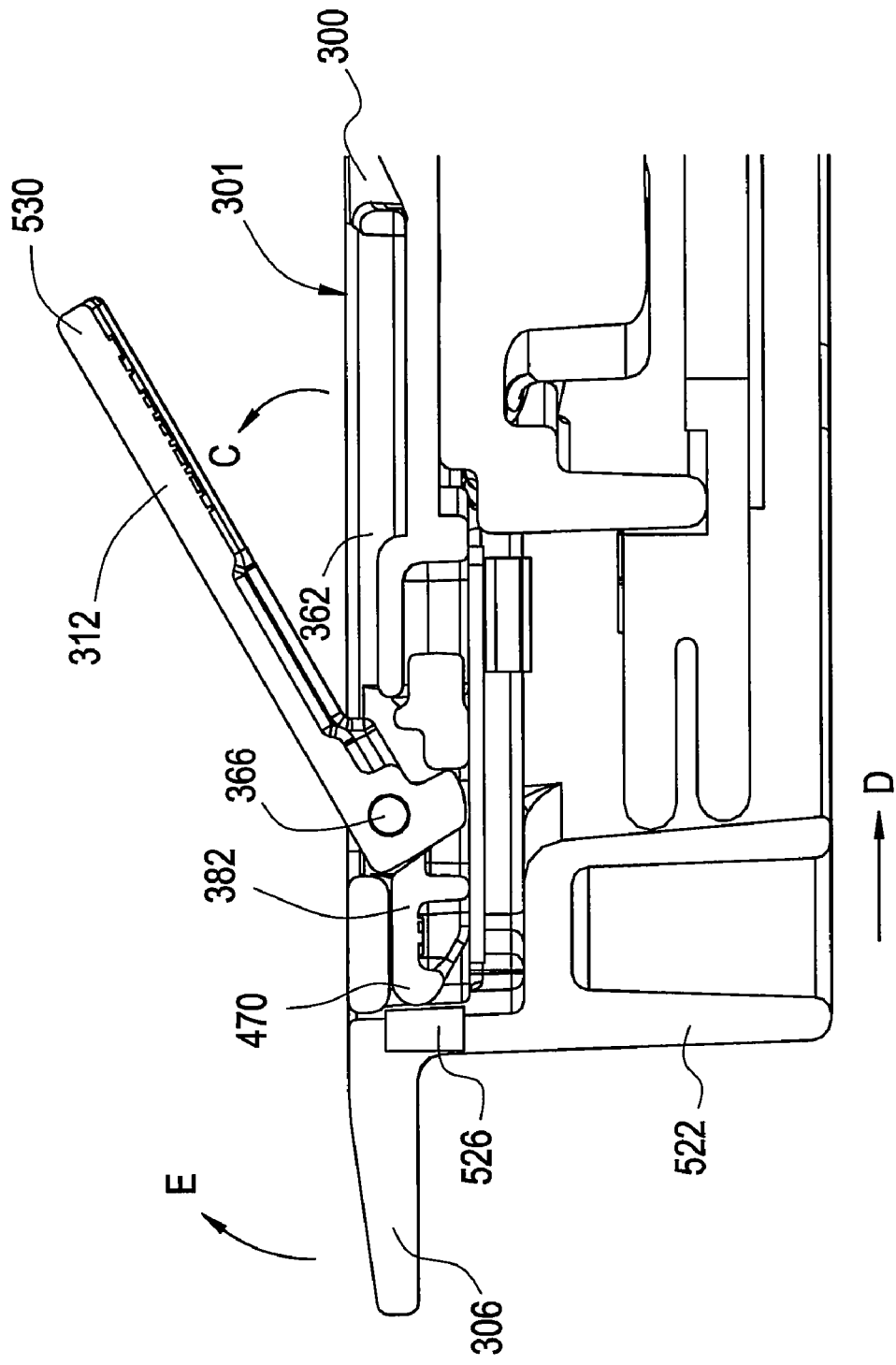
FIG. 16 illustrates a partial cross-sectional side view of the cover assembly of FIG. 11 with the latch in an unlock position.

FIG. 16 illustrates a partial cross-sectional side view of the cover assembly 301 with the latch 312 in an unlocked position. In order to unlock the cover 300 from the closed position, an operator rotates the latch body 530 about the latch pin 366 in the direction of Arrow C out of the slot 362. As the latch 312 is rotated in the direction of Arrow C, the latch tongue 382 slides in the direction of Arrow D and the tab 470 of the latch tongue 382 slides out of the slot 526 of the outer wall 522 into a retracted position. When the tab 470 is no longer in the slot 526, the operator pulls the cover 300 in the direction of arrow E to the open position and releases the latch 312 such that the latch body 530 returns to the slot 526 and the latch tongue 382 slides back into the locked position. In order to return the cover 300 to the closed position, the latch body 530 is rotated in the direction of arrow C to move the latch tongue 382 back into the retracted position and the cover 300 is rotated back to the closed position about the flange 304. The latch body 530 is then released back into the slot 362 such that the latch tongue 382 returns to the locked position with the tab 470 in the slot 526 and the cover 300 is secured in the closed position. Alternatively, the cover 300 can be returned to the closed position without using the latch 312 by pushing the cover 300 downward into the closed position with enough force such that the tab 470 is pushed into the retracted position by the rim 306 of the flange 304 until the tab 470 slides down into alignment with the slot 526 and extends back into the locked position in the slot 526.

Figure 17:
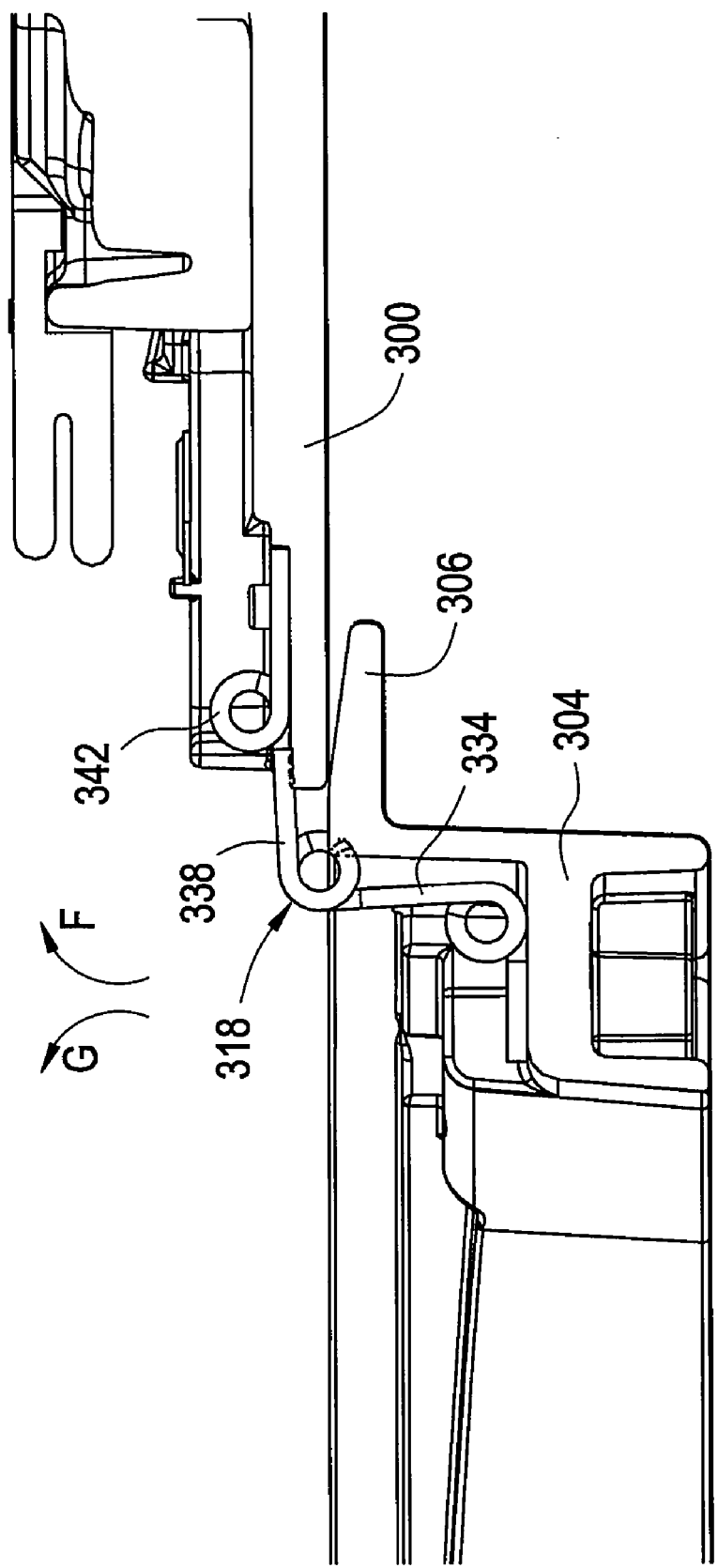
FIG. 17 illustrates a partial cross-sectional side view of the cover assembly of FIG. 11 in the open position.

FIG. 17 illustrates a partial cross-sectional side view of the cover 300 in the open position. The articulating hinge 318 is in an extended position. Referring to FIGS. 15 and 17, when the cover 300 is rotated from the closed position to the open position, the fourth hinge bracket 342 rotates in the direction of Arrow F with respect to the third hinge bracket 338 until the cover 300 is generally perpendicular to the rim 306 of the flange 304. As the cover 300 is further rotated to the open position, the third hinge bracket 338 is rotated out of the flange 304 in the direction of Arrow F, and the second hinge bracket 334 is rotated in the direction of Arrow F. When the cover 300 is returned to the closed position, the fourth, third, and second hinge brackets 342, 338, and 334 rotate in the direction of Arrow G back into the flange 304 and return to the closed position shown in FIG. 15.

FIG. 18 illustrates a bottom isometric view of the top plate 308 with the doors 314 in the closed position. The doors 314 are in the gaps 358 abutting the end walls 418 and the hooks 426 of the slide catches 370 extend over the end walls 414 and are positioned over the slots 406.

Figure 19:
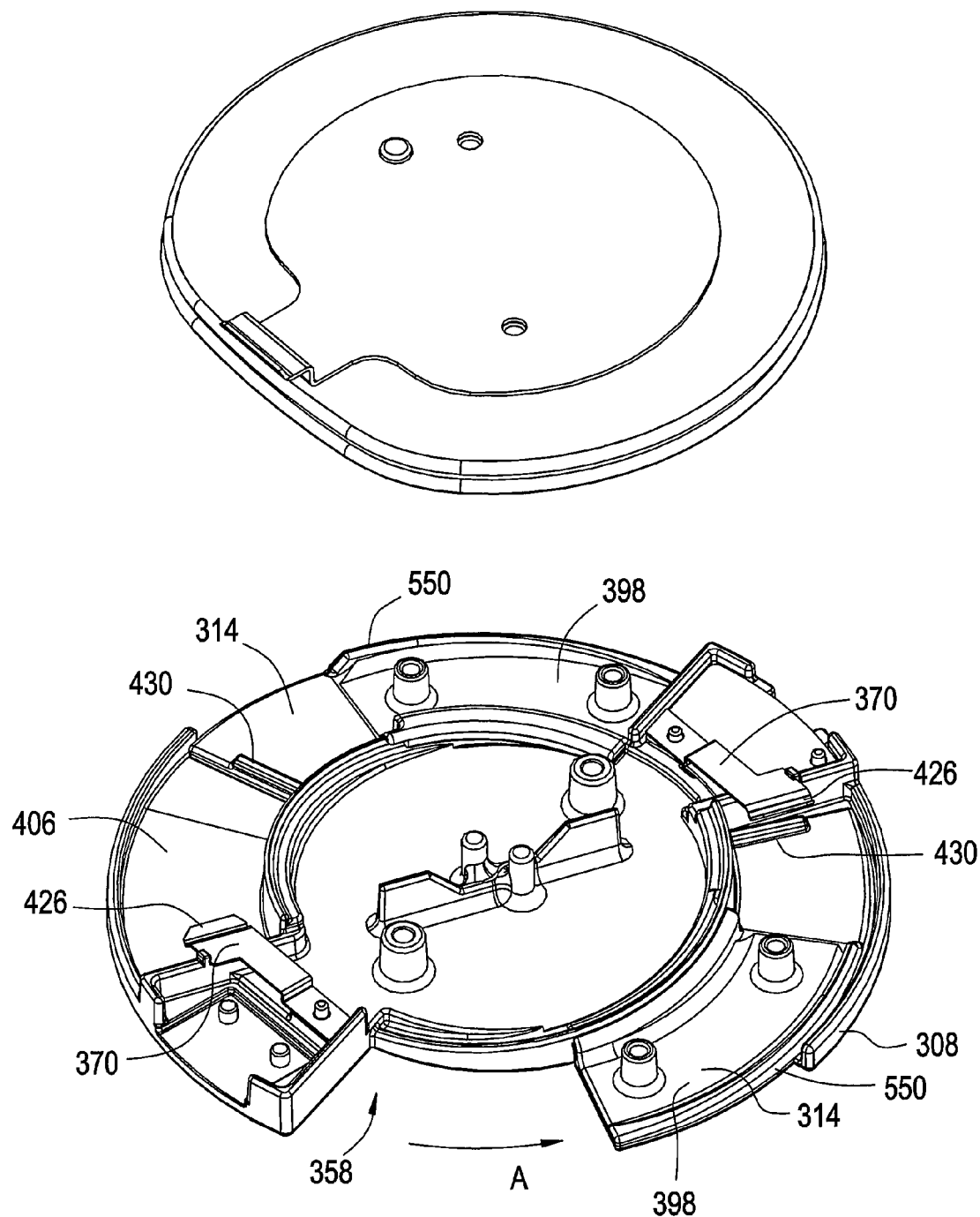
FIG. 19 illustrates a bottom isometric view of the top plate of the cover assembly of FIG. 11 with doors in the open position.
Figure 20:
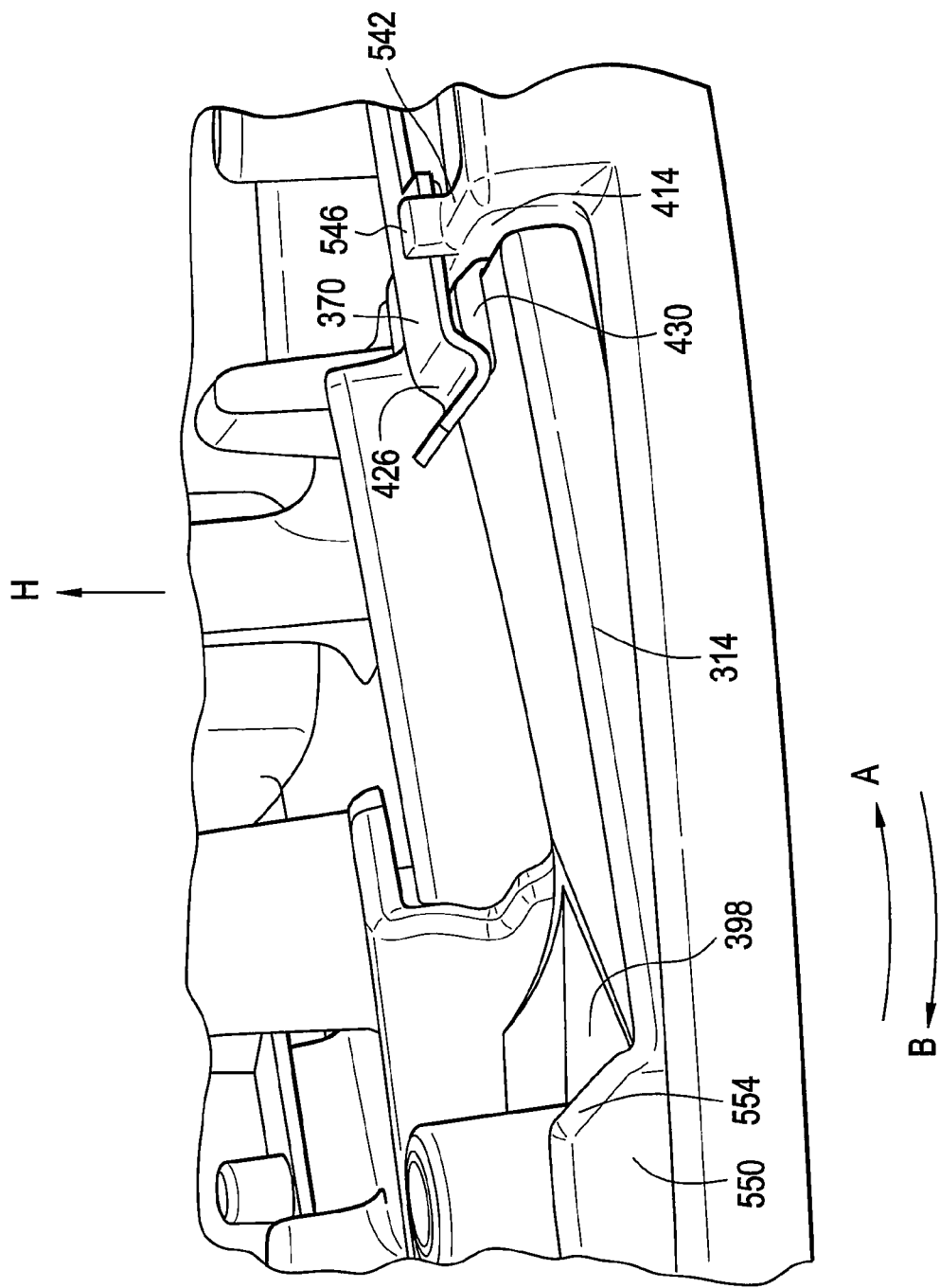
FIG. 20 illustrates a partial bottom isometric view of the door of the cover assembly of FIG. 11.

FIG. 19 illustrates a bottom isometric view of the top plate 308 with one of the doors 314 in the open position and FIG. 20 illustrates a partial bottom isometric view of door 314 engaging the slide catch 370. As the door 314 is rotated in the direction of Arrow A from the closed position to the open position, the torsion spring 374 (FIG. 14) engaging the door 314 is further compressed and resists the movement of the door 314 in the direction of Arrow A. The door 314 is rotated in the direction of Arrow A and slides into the slot 406 until the door 314 abuts the end wall 414. As the door 314 approaches the end wall 414, the tab 430 engages the hook 426 of the flexible slide catch 370. The hook 426 is pushed upward in the direction of arrow H as the tab 430 slides under the hook 426. After the tab 430 slides past the hook 426, the hook 426 snaps down toward the door 314 and retains the tab 430 between the hook 426 and the end wall 414 and holds the door 314 in the open position. At this point, the operator can release the door 314. The hook 426 holds the door 314 in the open position while the torsion spring 374 biases the door 314 in the opposite direction, effectively making the door 314 spring-loaded. The frame 542 includes a retention tab 546 that extends over the slide catch 370 to hold the slide catch 370 down on the frame 542 such that that hook 426 snapably engages the tab 430 and is not displaced when engaged by the tab 430.

Figure 21:
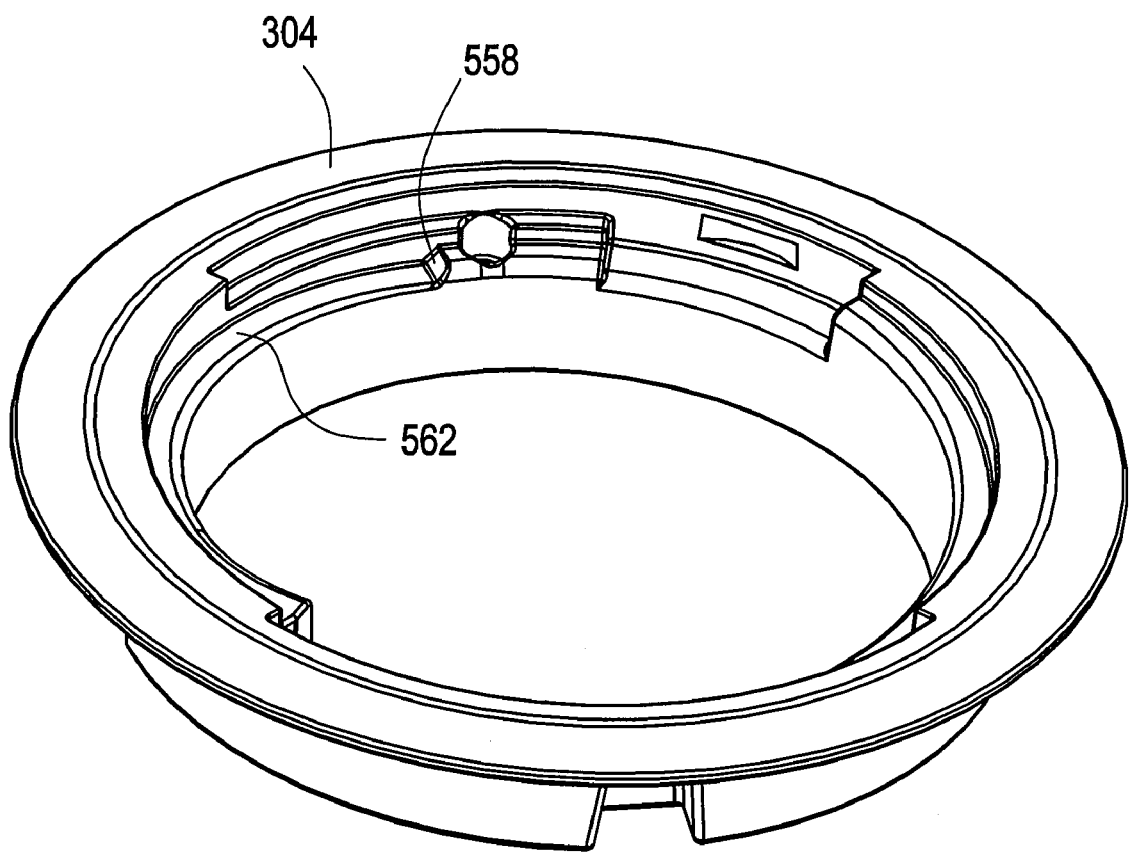
FIG. 21 illustrates a top isometric view of the flange of the cover assembly of FIG. 11.

The door 314 has a side panel 550 extending from the bottom side 398 thereof opposite the side wall 394. The side panel 550 includes a chamfered edge 554. Referring to FIGS. 20 and 21, the flange 304 has chamfered bosses 558 along ledges 562 that receive the side panels 550 of the doors 314 when the cover 300 is in the closed position in the flange 304. When a door 314 is retained in the open position by a slide catch 370 and the cover 300 is moved from the open position to the closed position within the flange 304, the chamfered edge 554 on the side panel 550 of the door 314 engages the corresponding chamfered boss 558 on the ledge 562 of the flange 304 and is pushed by the boss 558 in the direction of Arrow B away from the end wall 414. As the door 314 is pushed in the direction of Arrow B, the tab 430 snapably disengages from the hook 426. When the cover 300 is fully assembled, the compressed torsion spring 374 (FIG. 14) automatically pushes the released door 314 in the direction of Arrow B until the door 314 engages the gap end wall 418 (FIG. 14) and is in the closed position.

Figure 22:
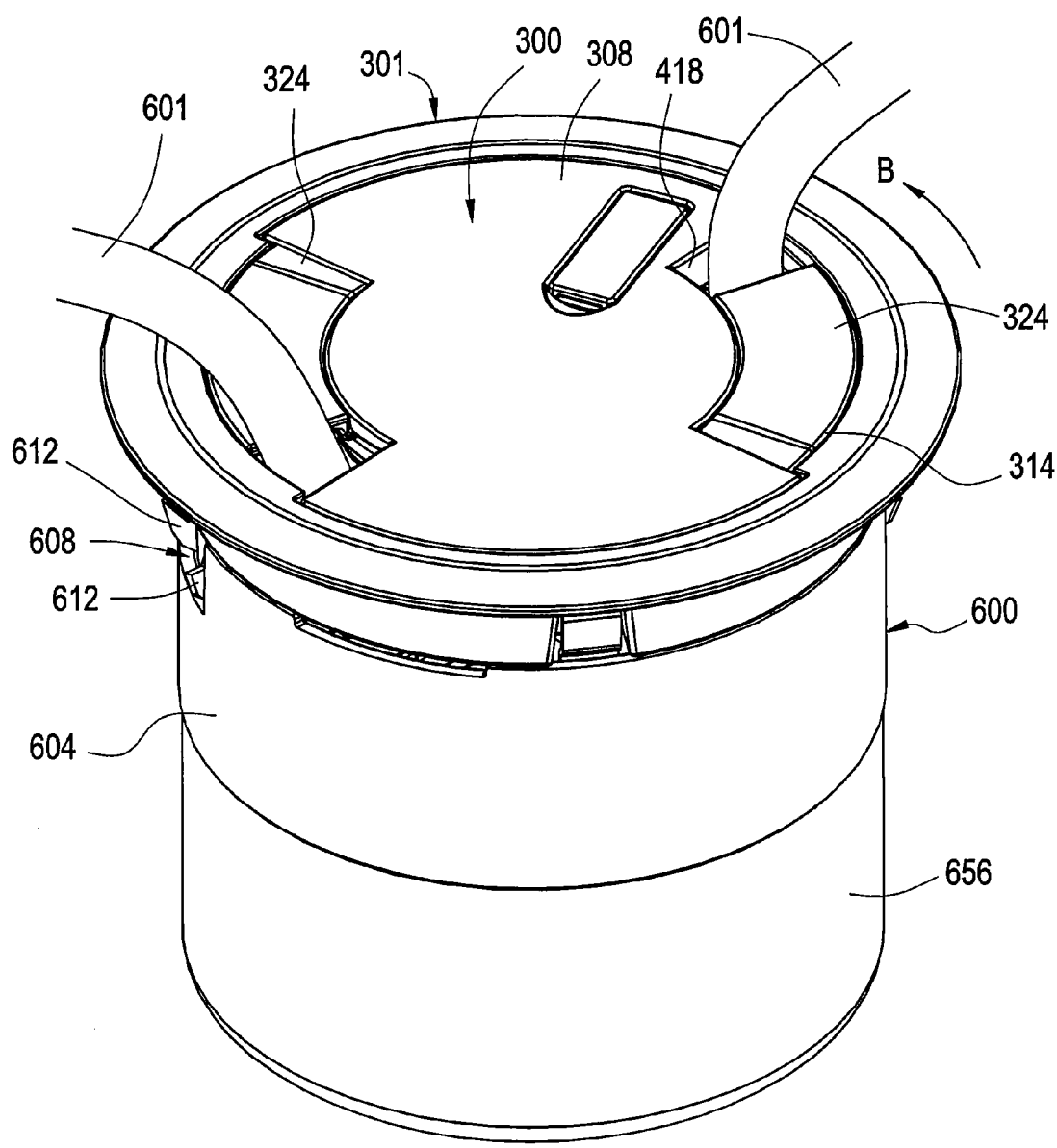
FIG. 22 illustrates a top isometric view of an assembled in-floor fitting formed according to an embodiment of the present invention.

Referring to FIG. 22, in operation, the cover assembly 301 is mounted to an in-floor fitting 600 and the in-floor fitting 600 is mounted in a hole in a floor such that the cover assembly 301 is positioned along the surface of the floor. Receptacles are mounted in the in-floor fitting 600 and are activated by being connected to wires/cables in the floor. When the cover 300 is in the closed position, the gasket 346 (FIG. 15) forms a water tight seal within the flange 304 to keep water from leaking into the fitting 600. An operator gains access to the receptacles in the fitting 600 by using the cover assembly 301.

Referring to FIG. 11, the cover 300 is in the closed position and has both doors 314 in the closed position. The operator opens the cover 300 by using the latch 312 to unlock the cover 300 and rotate the cover 300 to the open position as shown in FIGS. 12 and 16. When the cover 300 is in the open position as shown in FIG. 12, the operator inserts plugs or jacks (not shown) into the fitting 600 and connects the plugs or jacks to the receptacles such that the cords 601 of the plugs or jacks extend out of the fitting 600. The operator rotates the doors 314 into the open position against the resistant force of the torsion springs 374 (FIG. 14). Referring to FIGS. 19 and 20, as each door 314 slides into the open position, the door 314 engages the end wall 414 and is held in the open position by the slide catch 370 snapably engaging the tab 430 on the door 314.

When the doors 314 are in the open position, the operator rotates the cover 300 toward the closed position with the cords 601 positioned to extend through the gaps 358 in the top plate 308 that are exposed by the open doors 314. As the cover 300 engages the flange 304 to come to the closed position in the flange 304, the chamfered bosses 558 on the flange 304 engage the chamfered edges 554 on the doors 314 and push in the direction of Arrow B such that the tabs 430 of the doors 314 are snapably released from the slide catches 370. Referring to FIG. 14, as the doors 314 are released from the slide catches 370, the second arms 454 of the torsion springs 374 push the doors 314 in the direction of Arrow B toward the gap end walls 418. Returning to FIG. 22, as the doors 314 move in the direction of Arrow B, the doors 314 engage the cords 601 and push the cords up against the gap end walls 418. The doors 314 are held partially open by the cords 601 which are pinned between the gap end walls 418 and the spring loaded doors 314. When the doors 314 are in this partially open position, the top portions 320 of the doors 314 are exposed and the ramp portions 324 extend mostly underneath the top plate 308 such that the surface of the cover assembly 301 is generally flush except for the openings from which the cords 601 extend. Furthermore, the spring-loaded doors 314 automatically close when the cover 300 is closed so as to close any openings along the cover 300 that could catch on other objects and/or cause accidents. When the cover 300 is in the closed position and the cords 601 extend through the cover 300, the gasket 346 deforms about the cords 601 such that the cords 601 are able to extend between the gasket 346 and the interior wall 322 of the flange 304 and through the open doors 314.

The embodiments of the covers described herein provide the benefits of forming a radial seal with the gasket in the flange when the cover is closed, allowing the cover to be opened 180 degrees to provide full access to the interior of the in-floor fitting and reduce the likelihood of damaging the cover, and maintaining a generally flush cover surface even when doors are open in order to avoid damage to the cover and accidents caused by the cover and provide better aesthetics for the cover.

Referring to FIG. 22, the in-floor fitting 600 includes the cover assembly 301 mounted to an intumescent body 604. The body 604 is retained in a retention structure 656. The retention structure 656 operates similarly to the retention structures 70 shown in FIGS. 1-5. The body 604 includes at least one gap 608 along the outer periphery thereof from which extend a set of prongs or barbs 612. When the fitting 600 is positioned in a hole in a floor, the prongs 612 engage the wall of the hole to retain the fitting 600 in the hole and prevent the fitting 600 from being pulled out of the hole.

Figure 23:
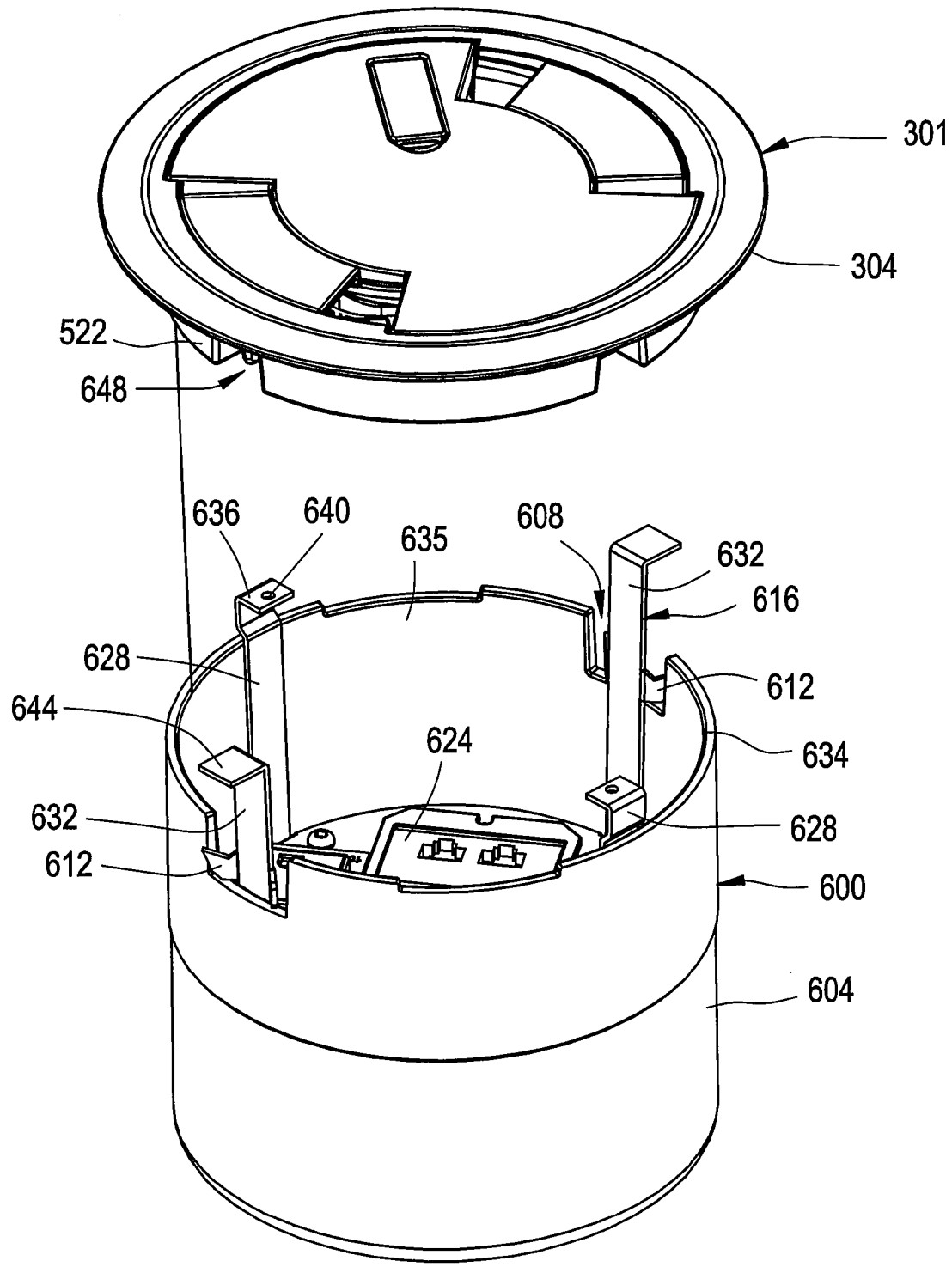
FIG. 23 illustrates an exploded isometric view of the in-floor fitting of FIG. 22.

FIG. 23 illustrates an exploded top isometric view of the fitting 600 and cover assembly 301 of FIG. 22. The body 604 includes a mounting bracket 616 positioned in an interior region 620. By way of example only, the mounting bracket 616 is made of a flexible metal material. The mounting bracket 616 carries receptacles/connection devices 624 for connection to plugs and/or jacks. The mounting bracket 616 include a set of mounting legs 628 and a set of retention legs 632 extending upwardly along an inner wall 635 of the body 604 and extending up above an upper rim 634 of the body 604. The mounting legs 628 include tabs 636 that extend inwardly and that include holes 640. The retention legs 632 include tabs 644 that extend outwardly. Each retention leg 632 includes a set of prongs 612 positioned in the gaps 608 of the body 604. The flange 304 includes gaps 648 along the outer wall 522 for receiving the tabs 636 and 644 when the cover assembly 301 is mounted to the fitting 600.

Figure 24:
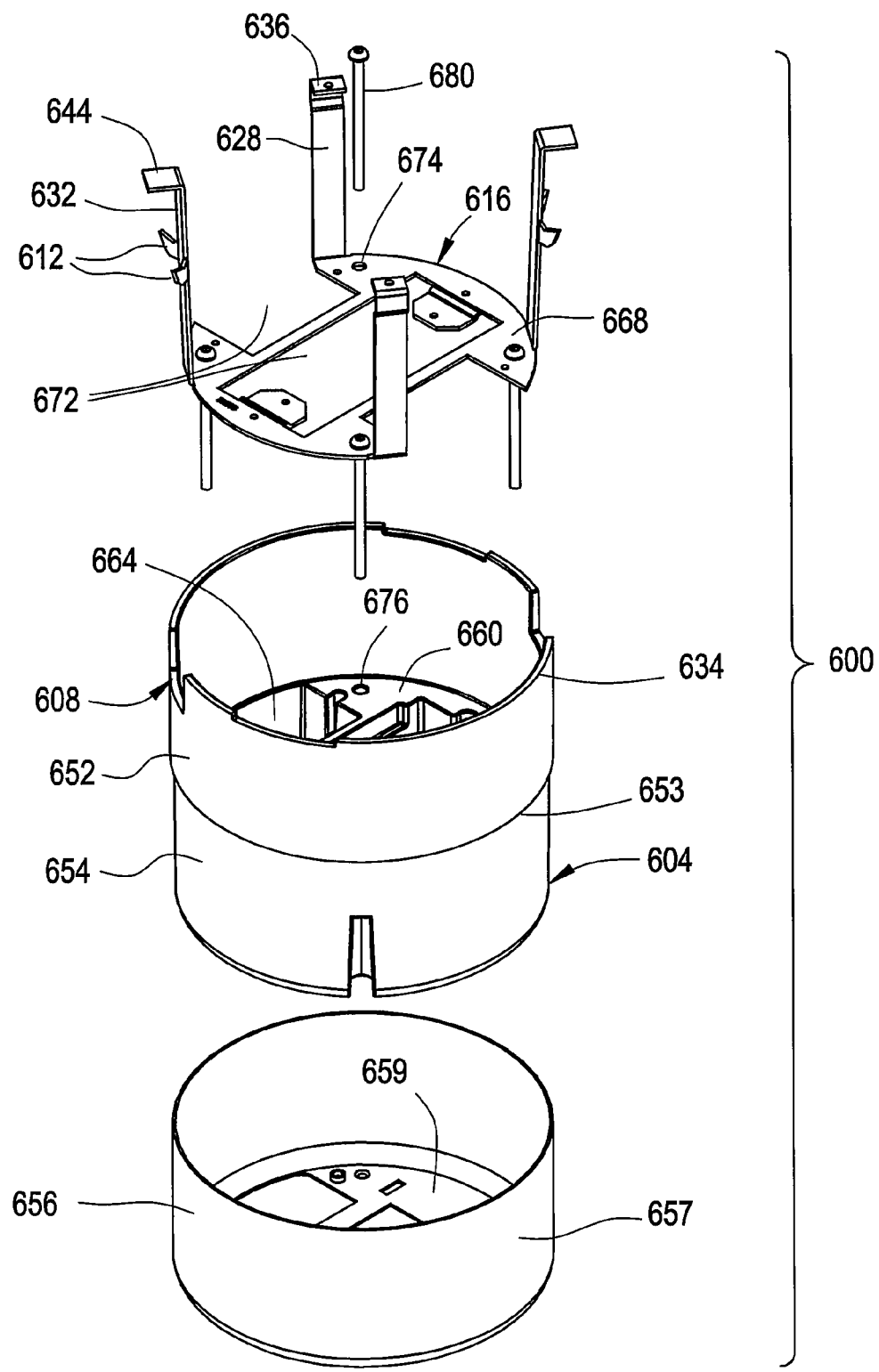
FIG. 24 illustrates an exploded isometric view of the body of the in-floor fitting of FIG. 22.

FIG. 24 illustrates an exploded top isometric view of the fitting 600 of FIG. 23. The body 604 includes an upper portion 652 and a lower portion 654 that meet at a lip 653. The upper portion 652 includes a ledge 660 with holes 664 for receiving the receptacles 624 (FIG. 23) and holes 676 for receiving screws 680. The bracket 616 includes a base plate 668 from which the mounting legs 628 and retention legs 632 upwardly extend. The base plate 668 includes gaps 672 for receiving receptacles and connection devices and holes 674 for receiving the screws 680.

Figure 25:
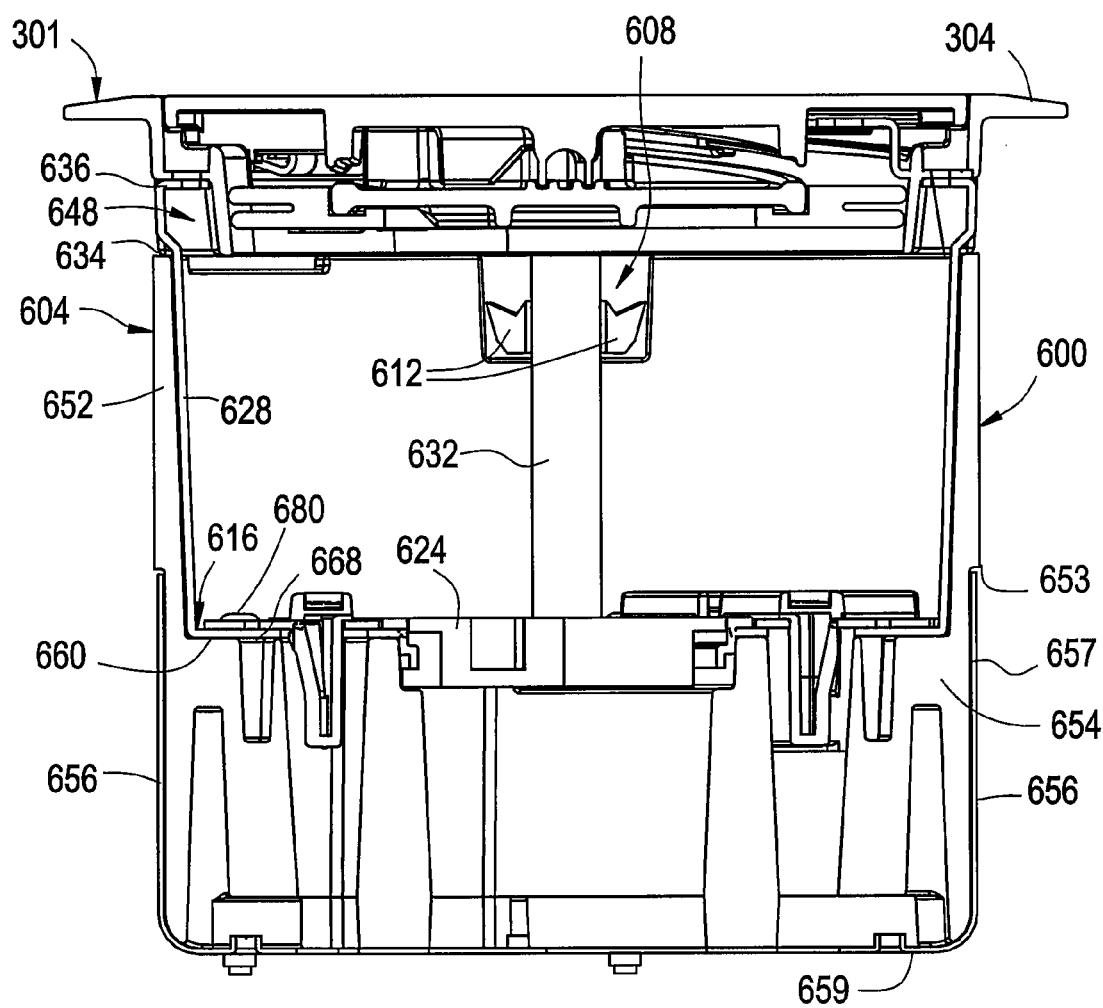
FIG. 25 illustrates a cross-sectional side view of the in-floor fitting of FIG. 22.

Referring to FIGS. 24 and 25, during assembly, the bracket 616 is mounted on the ledge 660 with the prongs 612 of the retention legs 632 received in the gaps 608. The holes 674 in the base plate 668 are aligned with the holes 676 in the ledge 660 and the screws 680 are inserted into the holes 674 and 676 to secure the base plate 668 to the ledge 660. The receptacles 624 are mounted into the gaps 672 of the base plate 668 and the holes 664 of the ledge 660. The lower portion 654 is received within the retention structure 656 such that the retention structure abuts the lip 653. The cover assembly 301 is then mounted onto the rim 634 of the body 604 with the tabs 636 and 644 being received in the gaps 648 of the flange 304. The holes 640 on tabs 636 of the mounting legs 628 are aligned with holes in the flange 304 to secure the tabs 636 to the flange 304 by screws or any other kind of fastener. In this way, the bracket 616 connects the cover assembly 301 to the body 604 of the fitting 600. When the fitting 600 is inserted into a hole in the floor such that the fitting 600 extends below the bottom surface of the floor, the retention structure 656 contains the expansion of the intumescent body 604 when the body 604 is caused to expand by heat or fire. The retention structure 656 has a continuous outer wall 657 and base 659 that direct the expansion of the intumescent material inward and that prevent the intumescent material from expanding out of the fitting 600. The outer wall 657 of the retention structure also biases against the wall of the hole to retain the fitting 600 within the hole.

Figure 26:
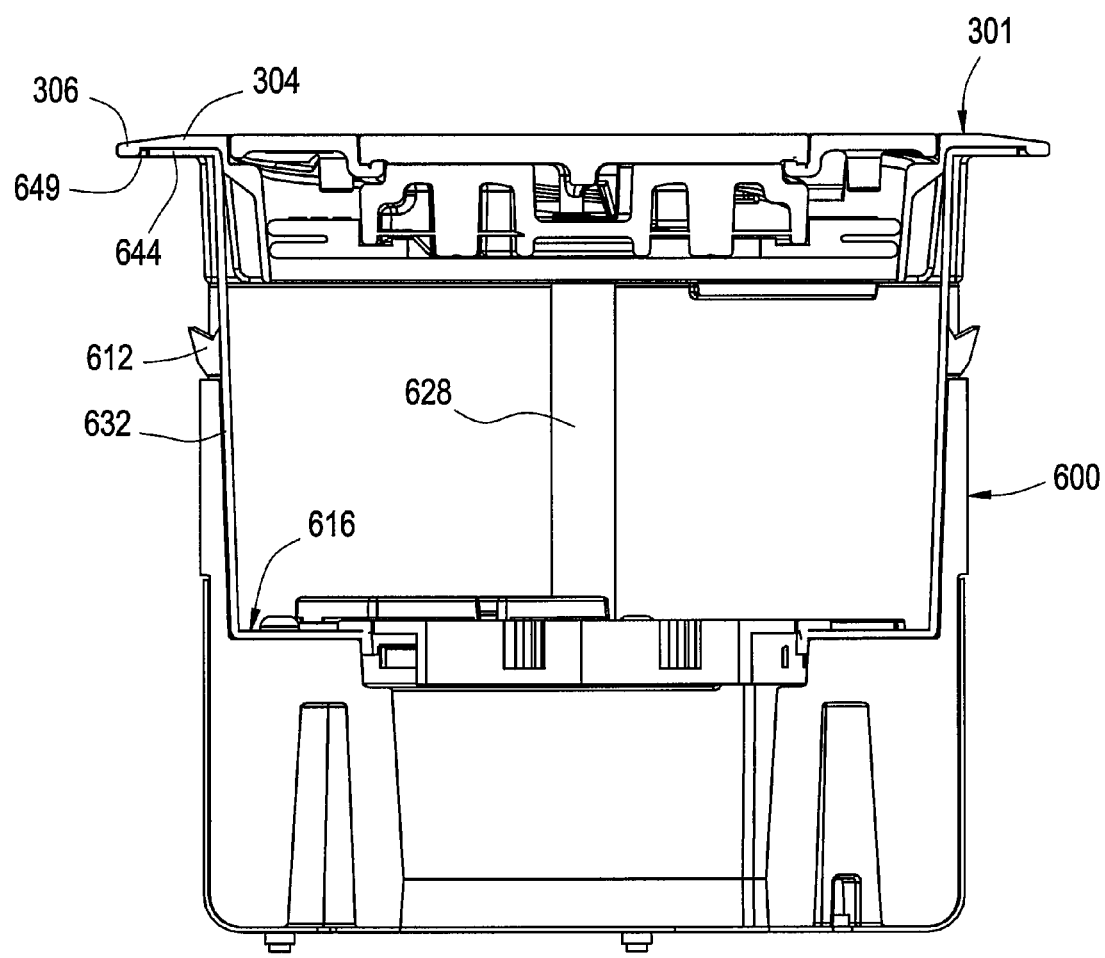
FIG. 26 illustrates a cross-sectional side view of the in-floor fitting of FIG. 22.

Referring to FIG. 26, the flange 304 has slots 649 underneath the rim 306 that receive the tabs 644 of the retention legs 632 such that the retention legs 632 support the flange 304.

Additionally, the outwardly extending tabs 644 extend over the surface of the floor when the fitting 600 is placed in the hole and therefore prevent the fitting 600 from falling into the hole when the cover assembly 301 or flange 304 is not attached to the tabs 636 (FIG. 25) on the mounting legs 628. When the fitting 600 is inserted into the hole in the floor, the barbs 612 extending from the retention legs 632 engage the concrete hole wall to secure the fitting 600 in the hole and prevent the fitting 600 from being pulled upward out of the hole. Alternatively, the fitting 600 may be used in a floor made of wood, composite, or another substance. The flange 304 holds the tabs 644 of the legs 632 in place in the slots 649 such that legs 632 are stabilized and are not biased inward and the barbs 612 resistably engage the hole wall. The bracket 616 therefore serves as a mounting bracket connecting the cover assembly 301 to the fitting and as a retention bracket for securing the fitting 600 within the hole.

Referring to FIG. 23, if an operator later wishes to remove the fitting 600 from the hole, the operator removes the cover assembly 301 from the fitting 600 such that the retention legs 632 are exposed. Because the barbs 612 are positioned along the upper rim 634 of the body 604, the operator can push the retention legs 632 such that the retention legs 632 flex inward toward the interior region 620 of the body 604 until the barbs 612 are disengaged from the hole wall. Once the barbs 612 no longer engage the hole wall, the operator then pulls the fitting 600 out of the hole. The fitting 600 and cover assembly 301 can be reconnected such that the tabs 644 of the retention legs 632 are received back in the slots 649 to realign the retention legs 632 such that the barbs 612 are in position to engage the wall of a hole. In this way, the cover assembly 301 serves to redirect the retention legs 632 back to their original position after the retention legs 632 are moved to disengage the barbs 612 from the wall of the hole and stabilize the legs 632 in that position.

The embodiments of the mounting/retention brackets described herein provide the benefits of a bracket that can be used to both secure the fitting in a hole and secure the body of the fitting to the cover assembly. The brackets also allow for easy release of the fitting from the hole without removing the entire bracket from the fitting.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A poke through fitting for mounting in a hole that extends through a concrete floor, comprising:
    a body made at least partially of intumescent material and having an outer wall, said body being configured to retain at least one receptacle; and
    a retention structure receiving at least a portion of said outer wall of said body within said retention structure, said retention structure being configured to retain said body within a hole in the floor and contain the expansion of said intumescent material.

2. The poke through fitting of claim 1, further including a cover configured to be mounted along the floor and being connected to at least one of said body and said retention structure such that an interior passage is defined within said body between said receptacle and said cover for receiving a plug with a cord within said body for connection to said receptacle, said cover being configured to be moved to a closed position about said passage and allow the cord to extend therethrough when in said closed position.

3. The poke through fitting of claim 1, wherein said retention structure includes a wall of interconnected slats connected to a base and said slats and base direct the expansion of said intumescent material inwardly.

4. The poke through fitting of claim 1, wherein said retention structure includes a base that prevents the expansion of said intumescent material downward out of said outlet box or into the hole.

5. The poke through fitting of claim 1, wherein said retention structure includes a wall of interconnected slats that are biased against the wall of the hole in the floor to retain said outlet box in the hole.

6. The poke through fitting of claim 1, wherein said retention structure includes at least one fastener that extends through said body for connection to a cover.

7. The poke through fitting of claim 1, wherein said retention structure includes a solid, continuous cylindrical exterior wall that directs the expansion of said intumescent material inwardly.

8. The poke through fitting of claim 1, wherein said retention structure includes a base having openings for receiving at least one of a conduit or a junction box carrying cables for connection to said receptacle.

9. The poke through fitting of claim 1, wherein said body has a ledge configured to carry at least one power receptacle and at least one data receptacle.

10. The poke through fitting of claim 1, wherein said retention structure includes a base having at least one opening that allows for wire connection to said receptacle in said body.

11. The poke through fitting of claim 1, wherein said body includes an upper interior region and a lower interior region, said upper interior region receiving said plug therein and said lower interior region receiving wire connections to said receptacle.

12. The poke through fitting of claim 1, further including a cover connected to said retention structure, said cover including at least one door configured to move to an open position to allow the cord of a plug to extend through an egress passage in said cover when said cover is closed over said body.

13. The poke through fitting of claim 1, further including a cover configured to be mounted along the floor and being connected to at least one of said body and said retention structure such that an interior passage is defined within said body between said receptacle and said cover, said body including a sidewall that extends along said interior passage from said receptacle to said cover.

14. The poke-through fitting of claim 1, wherein the retention structure comprises a generally circular base and an annular sidewall extending upwardly from said base.

15. The poke-through fitting of claim 14, wherein the annular sidewall is a continuous cylindrical structure.

16. The poke-through fitting of claim 14, wherein the annular sidewall includes openings therein.

17. The poke-through fitting of claim 16, wherein the openings are defined by a plurality of vertical slats.

18. The poke-through fitting of claim 14, wherein the sidewall comprises a plurality of slats.

19. The poke-through fitting of claim 1, wherein the intumescent body slides into the retention structure.

20. The poke-through fitting of claim 1, wherein the retention structure is formed of a metal.

21. A poke through fitting for mounting in a hole that extends through a concrete floor, comprising:
a body made at least partially of intumescent material configured to expand when activated by heat, wherein said body is configured to retain at least one receptacle; and
a containment structure receiving at least a portion of said body, said containment structure extending out of the hole and below the floor and being configured to contain the expansion of said intumescent material outside of the hole.

22. The poke through fitting of claim 21, further including a cover configured to be mounted along the floor and being connected to at least one of said body and said containment structure such that an interior passage is defined within said body between said receptacle and said cover for receiving a plug with a cord within said body for connection to said receptacle, said cover being configured to be moved to a closed position about said passage and allow the cord to extend therethrough when in said closed position.

23. The poke through fitting of claim 21, wherein said containment structure includes a wall of interconnected slats connected to a base and said slats and base direct the expansion of said intumescent material inwardly.

24. The poke through fitting of claim 21, wherein said containment structure includes a base that prevents the expansion of said intumescent material downward out of said outlet box.

25. The poke through fitting of claim 21, wherein said containment structure includes a wall of interconnected slats that are biased against the wall of the hole in the floor to retain said outlet box in the hole.

26. The poke through fitting of claim 21, wherein said containment structure includes at least one fastener that extends through said body for connection to a cover.

27. The poke through fitting of claim 21, wherein said containment structure includes a solid, continuous cylindrical exterior wall that directs the expansion of said intumescent material inwardly.

28. The poke through fitting of claim 21, further including a cover configured to be mounted along the floor and being connected to at least one of said body and said containment structure such that an interior passage is defined within said body between said receptacle and said cover, said body including a sidewall that extends along said interior passage from said receptacle to said cover.

29. A poke through fitting for mounting in a hole that extends through a concrete floor, comprising:
an insert body containing intumescent material that is configured to expand when activated by heat, said body retaining at least one receptacle therein;
a retention structure configured to receive said insert body, said retention structure being configured to engage the wall of the hole in the floor to retain said insert body within the hole and to contain the expansion of said intumescent material; and
a cover configured to be mounted along the floor and being connected to said insert body such that an interior passage is defined within said insert body between said receptacle and said cover for receiving a plug with a cord within said insert body for connection to said receptacle, said cover being configured to be moved to a closed position about said passage and allow the cord to extend therethrough when in said closed position.

30. The poke through fitting of claim 29, wherein said retention structure includes a wall of interconnected slats connected to a base and said base directs the expansion of said intumescent material inwardly.

31. The poke through fitting of claim 29, wherein said retention structure includes a base that prevents the expansion of said intumescent material downward out of said outlet box or into the hole.

32. The poke through fitting of claim 29, wherein said retention structure includes a wall of interconnected slats that are biased against the wall of the hole in the floor to retain said outlet box in the hole.

33. The poke through fitting of claim 29, wherein said retention structure includes at least one fastener that extends through said insert body for connection to said cover.

34. The poke through fitting of claim 29, wherein said retention structure includes a solid, continuous cylindrical exterior wall that directs the expansion of said intumescent material inwardly.

35. The poke through fitting of claim 29, wherein said insert body includes a sidewall extending along said interior passage from said receptacle to said cover.

36. A poke through fitting for mounting in a hole that extends through a concrete floor, comprising:
an intumescent insert that is configured to expand when activated by heat, said intumescent insert retaining at least one receptacle therein;
a retention structure configured to receive said intumescent insert, said retention structure having a wall configured to engage the wall of the hole in the floor to retain said intumescent insert within the hole and a base configured to contain the expansion of said intumescent insert;
a cover configured to be mounted along the floor and defining an interior passage within said intumescent insert between said receptacle and said cover for receiving a plug with a cord within said intumescent insert for connection to said receptacle, said cover being configured to be moved to a closed position about said passage and allow the cord to extend therethrough when in said closed position.

37. The poke through fitting of claim 36, wherein said wall of said retention structure includes slats connected to said base that are biased against the wall of the hole in the floor to retain said outlet box in the hole.

38. A poke-through fitting for installation in a hole in that extends between upper and lower surfaces of a concrete floor, the fitting comprising:
an intumescent body disposed at least partially in the hole in the floor when the fitting is installed in the hole; and
a retention structure receiving at least a portion of said intumescent body within said retention structure, said retention structure being configured to limit the expansion of said intumescent material.

39. The poke-through fitting of claim 38, wherein said intumescent body is configured to allow at least one electrical receptacle to be mounted therein.

40. The poke-through fitting of claim 38, wherein the retention structure comprises a generally circular base and an annular sidewall extending upwardly from said base.

41. The poke-through fitting of claim 40, wherein the annular sidewall is a continuous cylindrical structure.

42. The poke-through fitting of claim 40, wherein the annular sidewall includes openings therein.

43. The poke-through fitting of claim 42, wherein the openings are defined by a plurality of vertical slats.

44. The poke-through fitting of claim 40, wherein the sidewall comprises a plurality of slats.

45. The poke-through fitting of claim 38, wherein the intumescent body slides into the retention structure.

46. The poke-through fitting of claim 38, wherein the retention structure is formed of a metal.

47. The poke through fitting of claim 40, wherein the annular wall is configured to retain the fitting in the hole in the floor.

48. The poke through fitting of claim 47, wherein the annular wall is configured to be flexed inward when positioned within the hole in the floor in order to create a bias against a wall of the hole to retain the fitting in the hole.

49. The poke through fitting of claim 40, further comprising a conduit disposed below and coupled to the base.

50. The poke through fitting of claim 40, wherein the base further comprises at least one opening for communicating with a conduit.

51. The poke-through assembly as set forth in claim 50, wherein said conduit opening communicates with an inner portion of said conduit.

52. The poke-through assembly as set forth in claim 50, wherein said conduit is threadably connected to the base.

53. The poke-through assembly as set forth in claim 40, wherein said base includes at least one opening for passing cables therethrough.

54. The poke-through assembly as set forth in claim 40, wherein said base includes more than one aperture for passing at least one cable therethrough, the apertures spaced away from one another.

55. A poke-through fitting for installation in a hole in that extends between a top surface and a bottom surface of a concrete floor, the fitting comprising:
an intumescent body disposed at least partially in the hole in the floor, the intumescent body having a bottom portion that extends below the bottom surface of the concrete floor when the fitting is installed in the hole; and
a retention structure receiving the bottom portion of said intumescent body and limiting expansion of said intumescent material, the retentions structure comprising bottom wall and a sidewall extending upwardly from the bottom wall between a bottom surface of the intumescent body and the bottom surface of the concrete.

56. The poke-through fitting of claim 55, wherein said intumescent body is configured to allow at least one electrical receptacle to be mounted therein.

57. The poke-through fitting of claim 55, wherein the retention structure comprises a generally circular base and an annular sidewall extending upwardly from said base.

58. The poke-through fitting of claim 57, wherein the annular sidewall is a continuous cylindrical structure.

59. The poke-through fitting of claim 57, wherein the annular sidewall includes openings therein.

60. The poke-through fitting of claim 59, wherein the openings are defined by a plurality of vertical slats.

61. A poke-through fitting for installation in a hole in that extends between a top surface and a bottom surface of a concrete floor, the fitting comprising:
an intumescent body disposed at least partially in the hole in the floor, the intumescent body having a bottom portion that extends below the bottom surface of the concrete floor when the fitting is installed in the hole; and
a retention structure receiving at least the bottom portion of said intumescent body and being configured to limit the expansion of said intumescent material, the retention structure having a bottom wall and a sidewall extending upwardly from the bottom wall, the side wall extending from at least a bottom surface of the intumescent body to the bottom surface of the concrete floor.

62. The poke-through fitting of claim 61, wherein said intumescent body is configured to allow at least one electrical receptacle to be mounted therein.

63. The poke-through fitting of claim 61, wherein the retention structure comprises a generally circular base and an annular sidewall extending upwardly from said base.

64. The poke-through fitting of claim 63, wherein the annular sidewall is a continuous cylindrical structure.

65. The poke-through fitting of claim 63, wherein the annular sidewall includes openings therein.

66. The poke-through fitting of claim 65, wherein the openings are defined by a plurality of vertical slats.

\* \* \* \* \*